United States Patent
Hammerschmidt et al.

(10) Patent No.: US 7,831,220 B2
(45) Date of Patent: Nov. 9, 2010

(54) METHODS AND SYSTEMS FOR CALIBRATING FOR GAIN AND PHASE IMBALANCE AND LOCAL OSCILLATOR FEED-THROUGH

(75) Inventors: Joachim Hammerschmidt, Mountain View, CA (US); Rajendra T. Moorti, Mountain View, CA (US)

(73) Assignee: Broadcom Corporation, Irvine, CA (US)

( * ) Notice: Subject to any disclaimer, the term of this patent is extended or adjusted under 35 U.S.C. 154(b) by 1175 days.

(21) Appl. No.: 11/396,632

(22) Filed: Apr. 4, 2006

(65) Prior Publication Data

US 2007/0025433 A1   Feb. 1, 2007

Related U.S. Application Data

(60) Provisional application No. 60/702,324, filed on Jul. 26, 2005.

(51) Int. Cl.
*H04B 1/04* (2006.01)
(52) U.S. Cl. .................... 455/114.1; 455/114.3
(58) Field of Classification Search ........... 455/67.11, 455/67.14, 114.1, 114.2, 115.1, 115.2, 126, 455/114.3; 375/296, 224
See application file for complete search history.

(56) References Cited

U.S. PATENT DOCUMENTS

| | | | | |
|---|---|---|---|---|
| 6,032,028 | A * | 2/2000 | Dickey et al. | 455/110 |
| 7,382,833 | B1 * | 6/2008 | Peterson et al. | 375/296 |
| 2003/0123527 | A1 * | 7/2003 | Kim | 375/147 |
| 2004/0032913 | A1 * | 2/2004 | Dinur | 375/298 |
| 2008/0085683 | A1 * | 4/2008 | Husted et al. | 455/114.3 |

\* cited by examiner

*Primary Examiner*—Nguyen Vo
(74) *Attorney, Agent, or Firm*—Sterne, Kessler, Goldstein & Fox, P.L.L.C.

(57) ABSTRACT

Methods and systems to calibrating a transmitter for I/Q imbalance and local oscillator feed-through include generating a test tone, frequency up-converting the test tone, monitoring one or more features of the up-converted test tone, and adjusting one or more features of the transmitter in response to the monitoring. The monitoring optionally includes monitoring a beating of the envelope of the up-converted test tone. In an embodiment, a first harmonic of the up-converted test tone is monitored for local oscillator feed-through (LOFT). Alternatively, baseband data inputs to the transmitter are disabled, and LOFT is measured by measuring power at the transmitter output. A second harmonic of the up-converted test tone is monitored for gain and phase imbalances. The adjusting optionally includes adjusting a gain imbalance, adjusting a phase imbalance, and/or adjusting DC offsets. The adjusting optionally includes an iterative refinement process. Such a refinement process optionally includes performing a first monitoring, applying a set of relatively coarse settings to the one or more features in the transmitter, monitoring the beating resulting from each of the coarse settings, selecting the coarse setting corresponding the smallest beating, applying a set of relatively fine settings centered around the selected coarse setting, wherein the fine settings are more closely related to one another than are the coarse settings, monitoring the beating resulting from each of the fine settings, and selecting the fine setting corresponding the smallest beating.

54 Claims, 16 Drawing Sheets

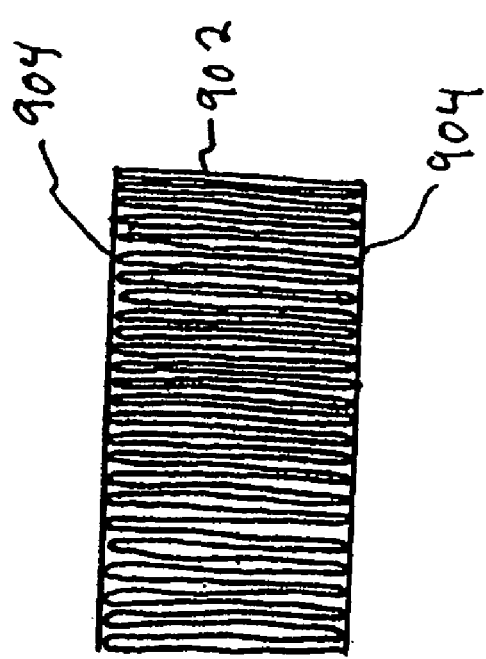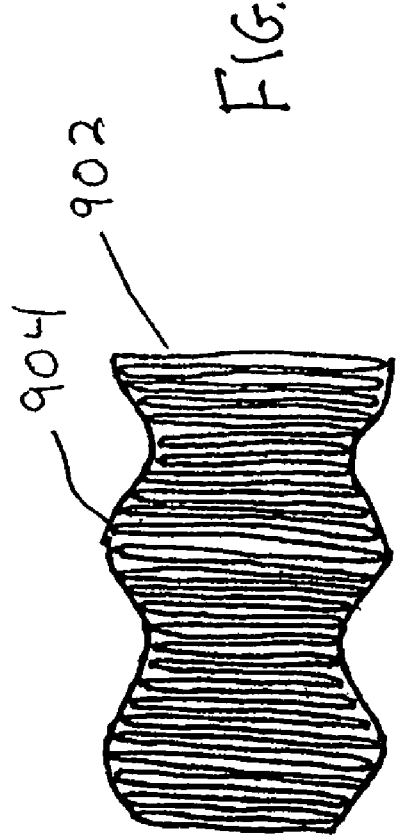

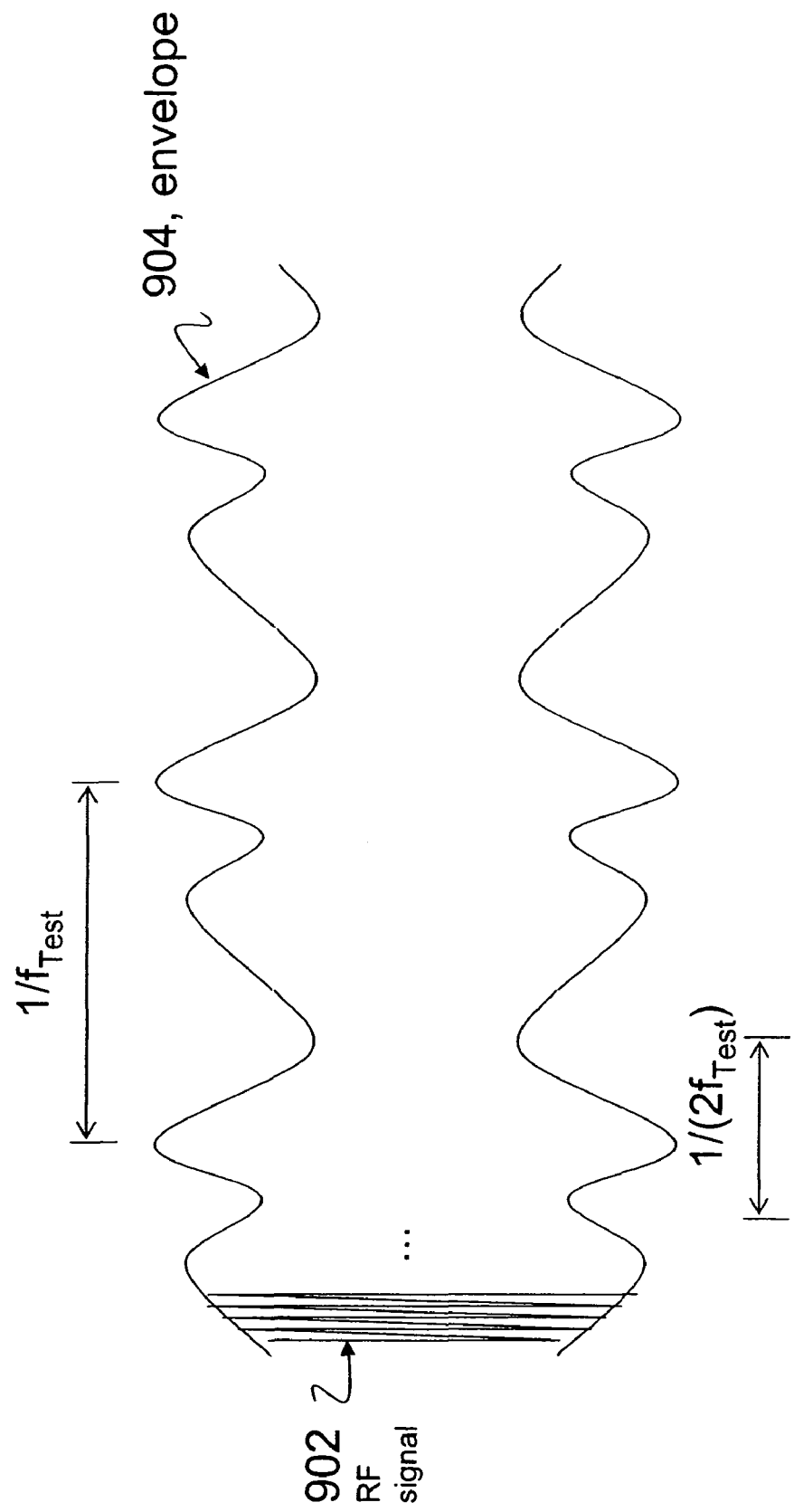

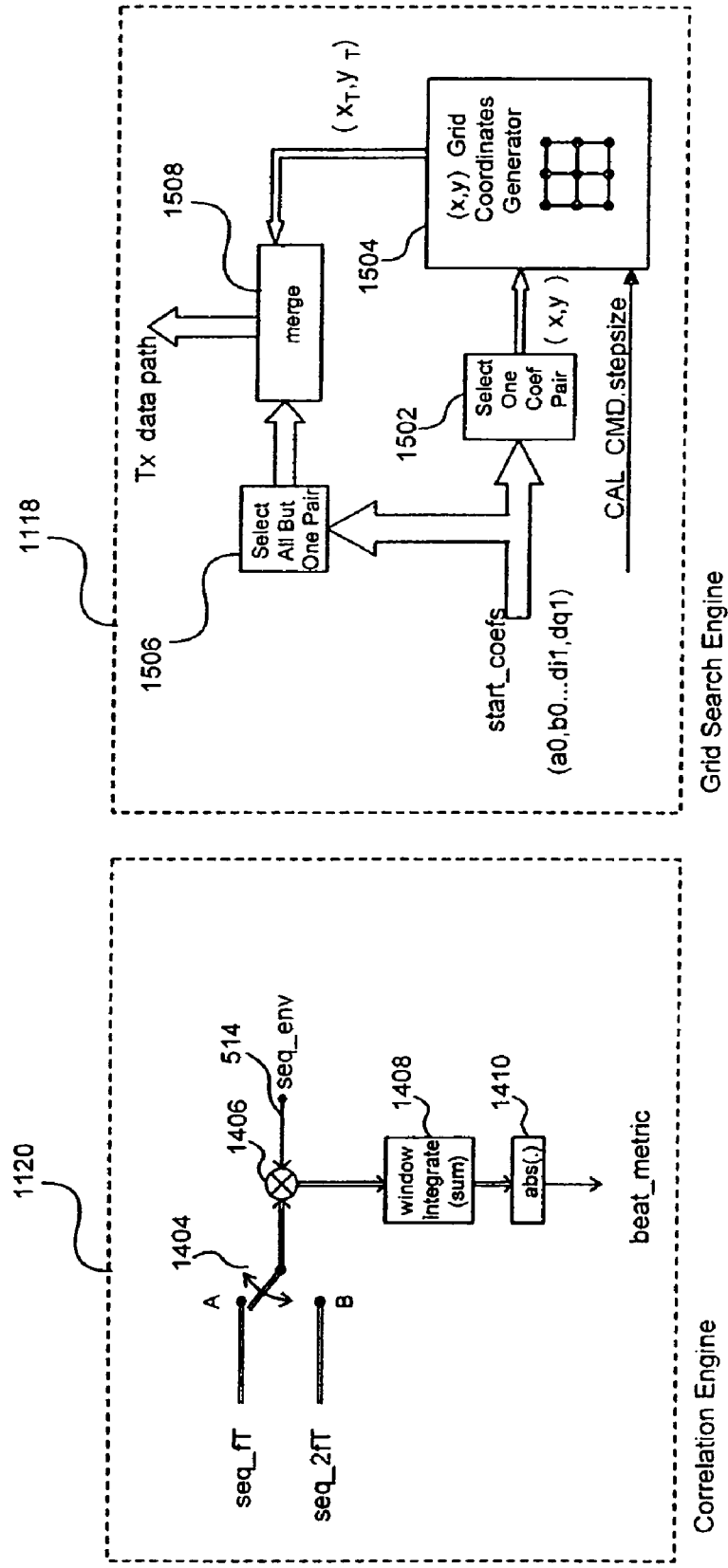

METHODS AND SYSTEMS FOR CALIBRATING FOR GAIN AND PHASE IMBALANCE AND LOCAL OSCILLATOR FEED-THROUGH

CROSS-REFERENCE TO RELATED APPLICATIONS

This application claims the benefit of U.S. Provisional Application No. 60/702,324, filed Jul. 26, 2005, titled, "Methods and Systems for Calibrating for Gain and Phase Imbalance and Local Oscillator Feed-Through," incorporated herein by reference in its entirety.

BACKGROUND OF THE INVENTION

1. Field of the Invention

The invention relates to transmitter calibration and, more particularly, to gain and phase imbalance and local oscillator feed-through compensation.

2. Related Art

Transmitters that utilize in-phase and quadrature ("I and Q") channels typically suffer from amplitude (i.e., gain) and phase imbalances, and from local oscillator feed-through (LOFT).

What are needed therefore are methods and systems to reduce gain and phase imbalances, and to reduce local oscillator feed-through.

SUMMARY OF THE INVENTION

The present invention is directed to methods and systems to reduce gain and phase imbalances, and to reduce local oscillator feed-through.

In an embodiment, a method of calibrating a transmitter includes generating a test tone, frequency up-converting the test tone, monitoring one or more features of the up-converted test tone, and calibrating the transmitter in response to the monitoring, thereby reducing gain and phase imbalances and local oscillator feed-through.

The monitoring optionally includes monitoring a beating of the envelope of the up-converted test tone. In an embodiment, a first harmonic of the test tone frequency is monitored in the envelope signal to calibrate for local oscillator feed-through (LOFT). Alternatively, baseband data inputs to the transmitter are disabled, and LOFT is measured by measuring power at the transmitter output. A second harmonic of the test-tone frequency in the envelope of the up-converted test-tone is monitored to calibrate for gain and phase imbalances.

Additional features and advantages of the invention will be set forth in the description that follows. Yet further features and advantages will be apparent to a person skilled in the art based on the description set forth herein or may be learned by practice of the invention. The advantages of the invention will be realized and attained by the structure particularly pointed out in the written description and claims hereof as well as the appended drawings.

It is to be understood that both the foregoing summary and the following detailed description are exemplary and explanatory and are intended to provide further explanation of the invention as claimed.

BRIEF DESCRIPTION OF THE DRAWINGS/FIGURES

The present invention will be described with reference to the accompanying drawings, wherein like reference numbers indicate identical or functionally similar elements. Also, the leftmost digit(s) of the reference numbers identify the drawings in which the associated elements are first introduced.

FIG. 9 is a timing diagram of a base band tone, frequency up-converted to an RF frequency.

FIG. 10A is a timing diagram of the RF signal having a beating effect on the envelope.

FIG. 10B is another timing diagram of the RF signal having a beating effect on the envelope.

FIG. 14 is an example block diagram of a correlation engine within the calibration control module.

FIG. 15 is an example block diagram of a grid search engine within the calibration control module.

DETAILED DESCRIPTION OF THE INVENTION

Table of Contents

I. Introduction: I/Q Imbalance and Local Oscillator Feedthrough (LOFT)
  A. I/Q Imbalance
  B. Local Oscillator Feedthrough (LOFT)
    1. True LOFT
    2. DC Offset Induced LOFT
    3. LOFT Illustration II. Calibration Compensation for I/Q Imbalance and LOFT
  A. I/Q Imbalance Compensation Coefficients
  B. LOFT Compensation Coefficients III. Methods and Systems for Calibrating I/Q Imbalance and LOFT Coefficients
  A. Diagnosing I/Q Imbalance and LOFT from RF Envelope (Spectral Component Analysis)
  B. Pair-Wise and Iterative Coefficient Calibration IV. Example Embodiments
  A. Envelope Beating Measuring (DFT)
  B. Grid Searching
  C. Amplitude and Gain Control
  D. Multiple Antenna Embodiments
  E. Example Methods V. Conclusion

I. INTRODUCTION: I/Q IMBALANCE AND LOCAL OSCILLATOR FEEDTHROUGH (LOFT)

The present invention is directed to methods and systems to reduce gain and phase imbalances and local oscillator feedthrough ("LOFT").

Figure 1:
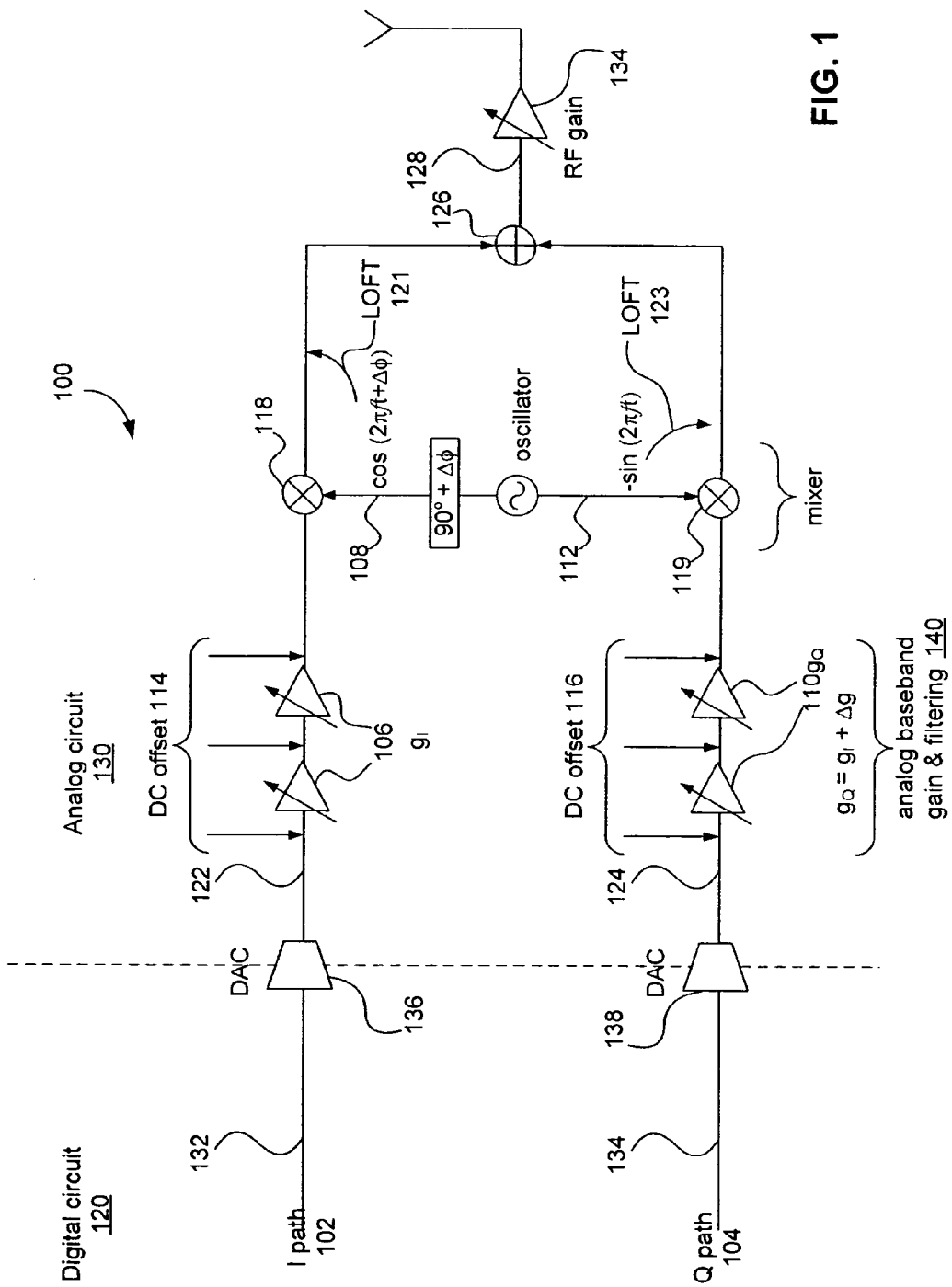
FIG. 1 is a block diagram of an example transmitter.

FIG. 1 is a block diagram of an example transmitter 100 including a digital circuit 120 and an analog circuit 130. Transmitter 100 also includes an in-phase ("I") path 102 and a quadrature ("Q") path 104. The digital circuit 120 generates I and Q baseband signals 132 and 134, respectively, which are converted to analog I and Q signals 122 and 124, respectively, and provided to the analog circuit 130.

Analog circuit 130 includes I and Q mixers 118 and 119, respectively. I mixer 118 receives an I mixer signal 108, illustrated here as $\cos(2\pi ft)$ 108. Q mixer 119 receives a Q mixer signal 112, illustrated here as $-\sin(2\pi ft)$ 112. The mixers 118 and 119 frequency up-convert respective I and Q analog signals 122 and 124. The resulting signals are combined by a signal combiner 126 to form an output signal 128.

A. I/Q Imbalance

Analog circuit 130 includes filtering and inherent gains 140. In the example of FIG. 1, inherent gains are illustrated as I path filtering and gains $g_I$ 106, and Q path filtering and gains $g_Q$ 110.

Ideally, the gains $g_I$ 106 and $g_Q$ 110 are equal, and the mixer signals, $\cos(2\pi ft)$ 108 and $-\sin(2\pi ft)$ 112, are exactly 90 degrees apart. In practice, however, the gains differ (i.e., $g_Q = g_I + \Delta g$) and the phase offset is not exactly 90 degrees. These phenomena are referred to as amplitude imbalance (or gain imbalance) and phase imbalance.

Figure 2A:
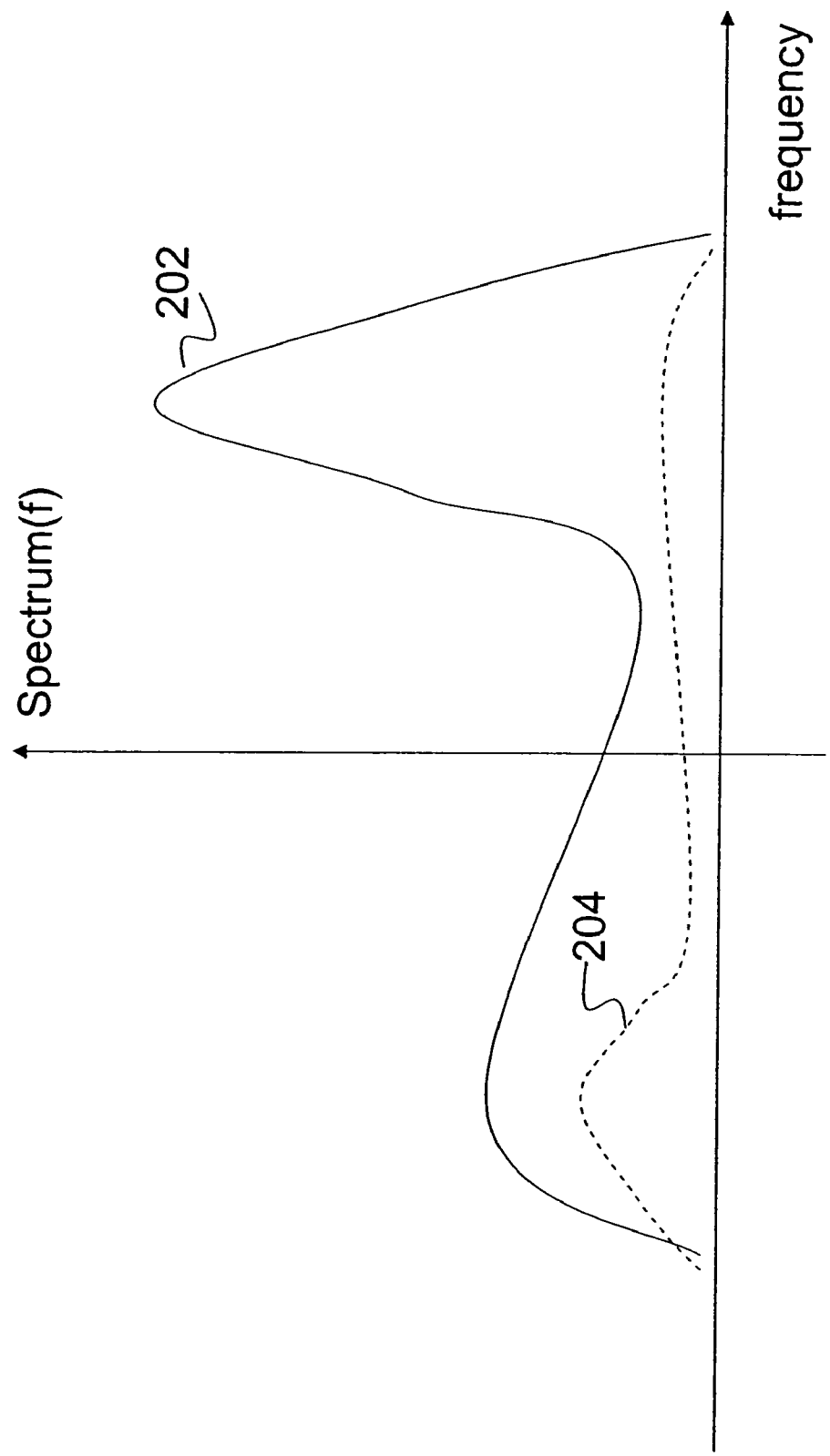
FIG. 2A is a spectrum diagram of a desired signal and an image signal.
Figure 2B:
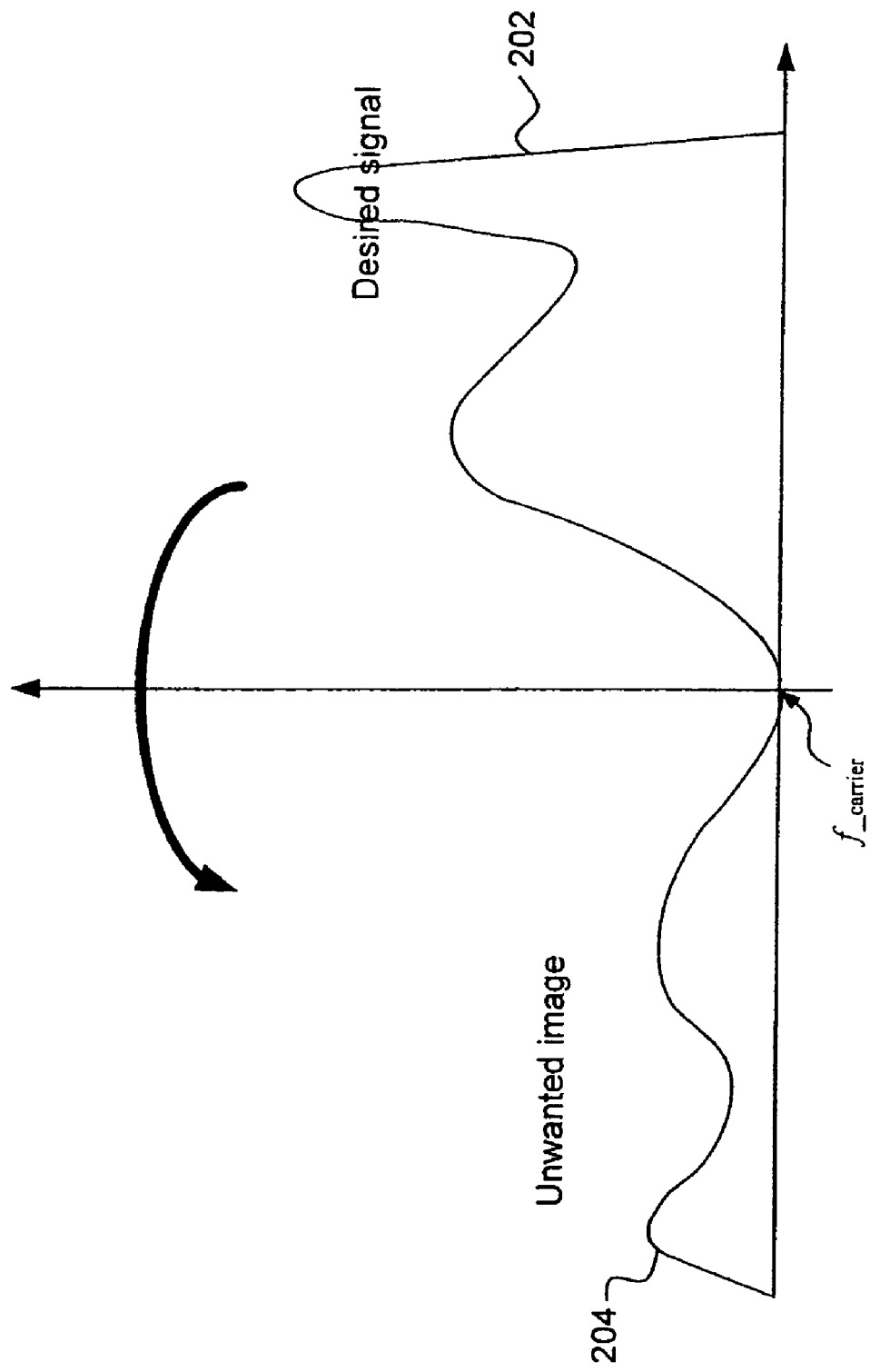
FIG. 2B is another spectrum diagram of the desired signal and the image signal.

Amplitude imbalance and phase imbalance, also referred to herein as I/Q imbalance, lead to images of a desired signal. In other words, when a signal passes though the transmit chain, and the chain is unbalanced, an image is created. For example, FIG. 2A is a spectrum diagram of a desired signal 202, and an image signal 204. The image signal 204 adds undesired energy to the signal 202, leading to "intra-signal" distortion. Note that there may be situations in which the desired signal portion is modulated on only one side of the carrier, as illustrated in FIG. 2B.

It is desirable to avoid images, such that the adjacent channel in which the image falls, is protected. In fact, while "intra-signal" imaging may be necessary for signal integrity, protecting the adjacent channel may be a regulatory issue. That is, transmissions in a given channel are only allowed, by regulation, to spill a very limited amount into neighboring channels. Hence, the requirements on avoiding images can be more stringent in a case where the desired signal is modulated on one side of the carrier.

Methods and systems for reducing I/Q imbalance are provided in sections below.

B. Local Oscillator Feed-Through (LOFT)

The term LOFT is used herein to describe two phenomena, referred to herein as true LOFT and DC offset-induced effective LOFT.

1. True LOFT

Referring back to FIG. 1, true LOFT is caused by the local oscillator signals 108 and 112, (the sin, cos signals that mix the incoming baseband signals up to around the carrier at RF), "talking into" the RF signal. The mixing terms 108 and 112 (sin, cos), represent the carrier at the carrier frequency. Therefore, if they don't act only multiplicatively on the incoming baseband signal 122 and 124, as desired, but also cross-talk additively into the output after the mixing (the multiplications 118 and 119 in FIG. 1), they will be visible as energy at exactly the carrier frequency in signal 128. This effect is referred to as "true" LOFT, because it is the local oscillator signals 108 and 112 that are feeding through, instead of just acting on the multipliers to shift up the desired signal in the frequency domain. True LOFT occurs because the isolation between the sin/cos signals and the output signals is imperfect. The arrows noted as LOFT 121 and 123 denote true LOFT.

2. DC Offset Induced LOFT

DC offset-induced effective LOFT is caused by DC offsets in the system prior to frequency up-conversion, or mixing. DC offset is a phenomenon which can occur anywhere in an analog transmit chain, at baseband, before mixing with the carrier. DC offset is due to imperfect component balancing relating to a given signal (e.g., of various signal components representing the I rail, or the Q rail). DC offset in the analog transmit chain, prior to the mixer, leads to a signal component in the RF signal that falls exactly on the carrier frequency position. In the example of FIG. 1, DC offset is illustrated as DC offset terms 114 and 116. The DC terms are up-converted by the mixers 108 and 112 to form an unwanted signal at the carrier frequency. In other words, mixing shifts all signal components up by the carrier frequency $f_c$. Thus, if a DC term is present at baseband, it will be upconverted to the carrier frequency $f_c$. Note that while this effect of baseband DC on the RF is not strictly LOFT, the net result is generally indistinguishable from true LOFT.

3. LOFT Illustration

Figure 3:
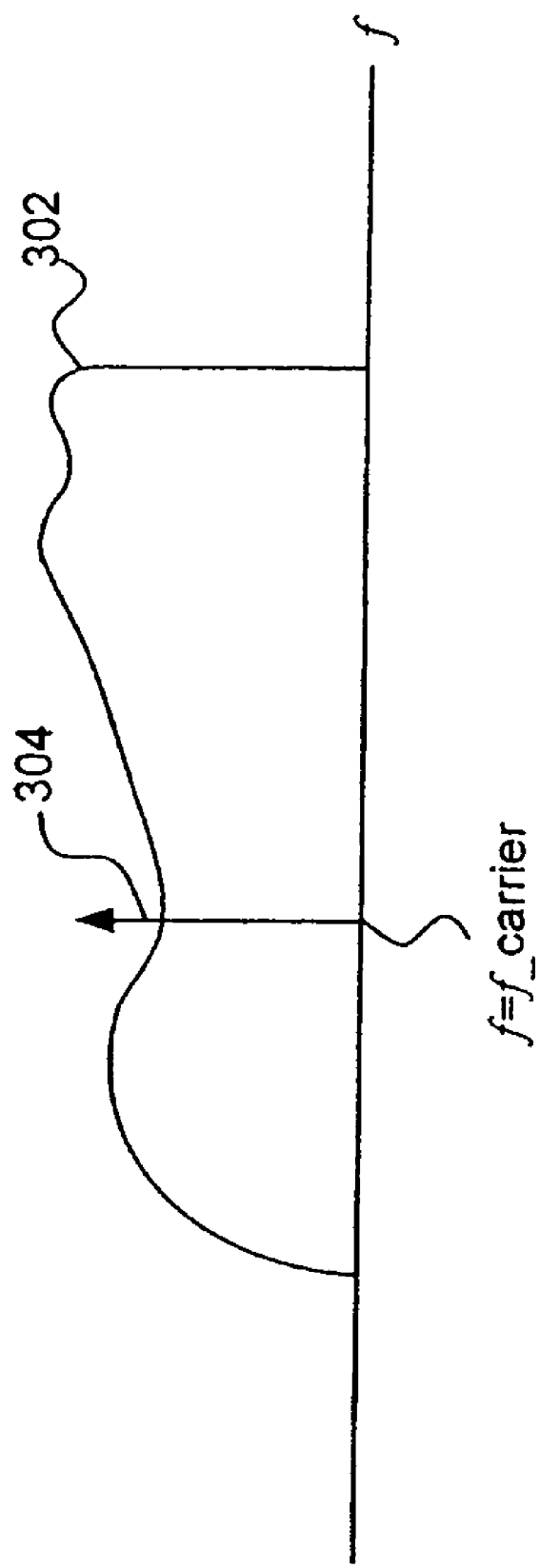
FIG. 3 is a spectrum diagram of a desired signal and an undesired local oscillator feed-through signal.

FIG. 3 is a spectrum diagram of a desired signal 302 and an undesired LOFT signal 304. The LOFT signal 304 blanks out desired signal energy and may saturate elements in the transmitter. LOFT can also be problematic on the receiver (e.g., during synchronization) when there is an unwanted LOFT component in the incoming signal that may lead to early triggering.

To summarize, the cause for what is commonly referred to be "LOFT" is two-fold, namely DC at baseband, as well as actual physical or true LOFT. Both effects are desired to be suppressed, because both lead to unwanted signal at RF. Another reason to calibrate or compensate for LOFT is to enable calibration for IQ imbalance, as is described in sections below.

II. COMPENSATION COEFFICIENTS FOR I/Q IMBALANCE AND LOFT

I/Q imbalance and LOFT can be reduced by inserting compensation to the digital circuit 120 and/or to the analog circuit 130. For example, FIG. 4 is a block diagram of the transmitter 100 including compensation coefficients to compensate for I/Q imbalance and LOFT.

A. I/Q Imbalance Compensation Coefficients

Figure 4:
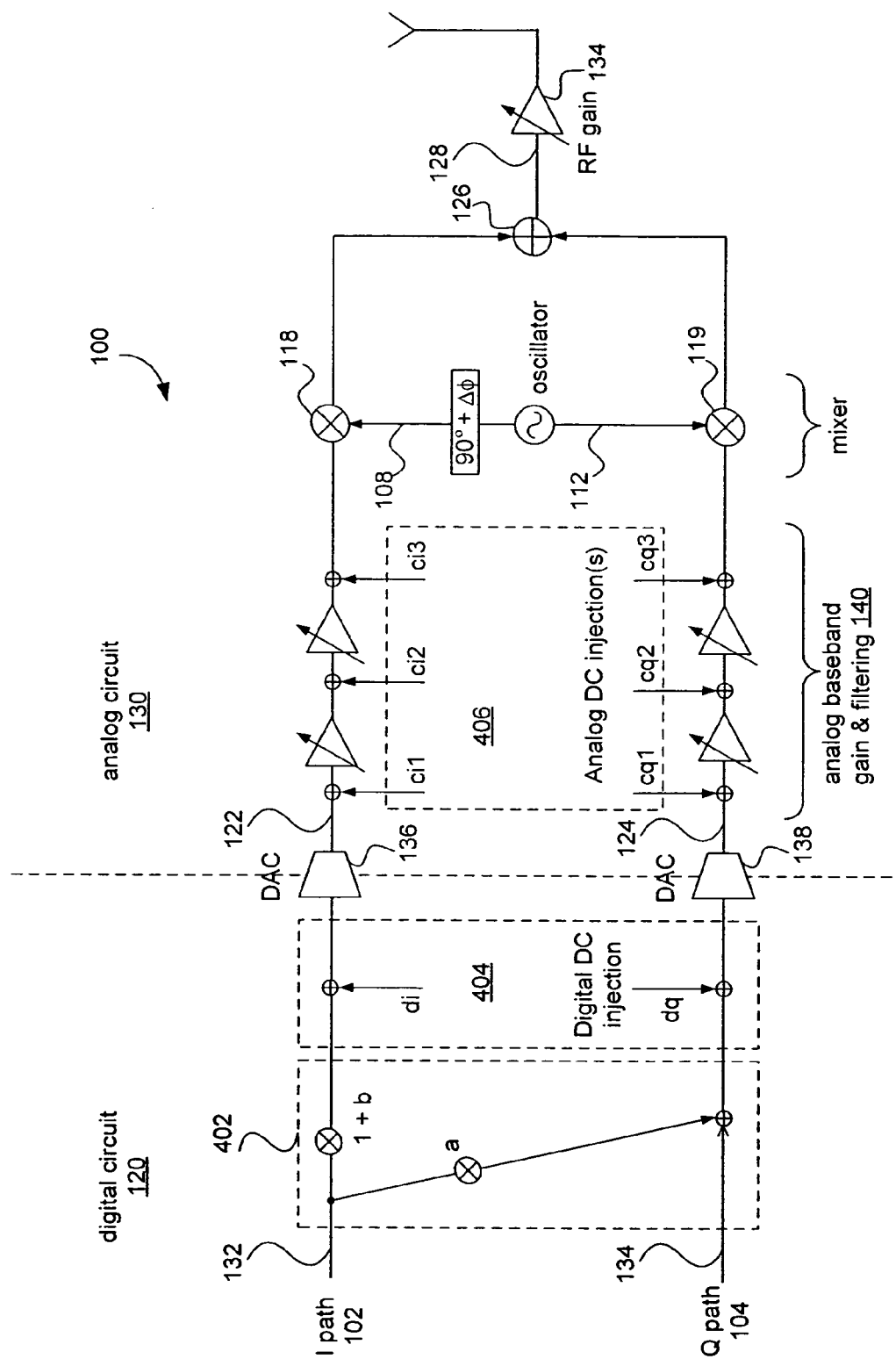
FIG. 4 is a block diagram of the transmitter illustrating compensation coefficients.

In FIG. 4, the transmitter 100, includes an I/Q imbalance compensation module 402. The I/Q imbalance compensation module 402 applies compensation values "a" and "b", as illustrated.

Value "a" is primarily for phase offset compensation. Value "b" is primarily for gain offset compensation. Values "a" and "b" are typically near unity in a system where the transmitter exhibits small gain/phase offsets.

In the example of FIG. 4, the "b" value compensation is applied to the I path. The invention is not, however, limited to this example embodiment. Based on the teachings herein, one skilled in the relevant art(s) will understand that other configurations are possible and within the scope of the present invention. Together, the two coefficients a and b applied to the I and Q rails of a given complex signal, represent the compensation coefficient pair, to be adjusted during I/Q imbalance calibration of the given signal.

B. LOFT Compensation Coefficients

In order to counter true LOFT and DC offset-induced LOFT, DC is injected at baseband. This can be done in the digital domain and/or in the analog domain. LOFT compensation is typically provided in the form of DC injection, i.e., addition of constant currents or voltages in the analog domain, and/or corresponding numeric representations in the digital domain. The DC injection coefficients, i.e., the values of those injections, are generally provided as near to the source of the LOFT-inducing effects as reasonably practical. This helps to ensure efficient use of the available dynamic range of system components. This is described below.

LOFT can cause saturation of analog blocks. This is especially true for later components in the transmit chain, especially in power amplifier 134 that feeds the antenna. When DC compensation is injected at baseband in the front end of the transmitter, such as in digital circuit 120, the dynamic range of the signals is affected. That is, the chain will be more prone to clipping or non-linear distortion. This is because the injected DC will increase signal levels from the point of injection to the point where the physical impairment occurs. Only at that point will the DC effect cancel out. This is particularly true for the effective range of digital-to-analog converters ("DACs") 136 and 138. Thus, before the mutual cancellation takes place, DC compensation tends to consume dynamic range. Therefore, it is desirable to inject DC compensation close to where the analog impairment occurs.

Accordingly, in some instances, DC injection is added in the analog domain just prior to the mixers. This would be one typical place to compensate for true LOFT. This can be performed in addition to, or as an alternative to, DC injection in the digital circuit 120. Also, it may be advantageous to employ additional analog DC injection capability earlier in the transmit chain of the analog circuit 130, close to the DC offsets 114 and 116 (FIG. 1). That way, the analog impairment and the corresponding compensation (DC injection) are close together, and saturation effects in the chain due to DC can be minimized.

For example, in FIG. 4, the transmitter 100 provides LOFT compensation in the form of DC compensation digital values $d_I$ and $d_Q$, and analog values ci1, ci2, ci3, cq1, cq2, and cq3. The invention is not, however, limited to the example of three analog DC compensation coefficients. More or fewer analog DC compensation coefficients can be used. For ease of description, throughout the remainder of the description, analog DC compensation coefficients will be referred to generally as ci and cq coefficients.

The digital DC injection coefficients $d_I$ and $d_Q$ can be used to compensate for digitally-induced DC offsets. LOFT compensation coefficients di and dq are generally functions of DC offsets on I and Q, functions of the true LOFT (cross coupling of carrier signal to output), and possibly analog LOFT compensation, such as the exemplary ci and cq.

The analog DC injection coefficients ci1, ci2, ci3, cq1, cq2, and cq3 can be used to compensate for analog component-induced DC offsets and for true LOFT. For example, ci3 and cq3 can be injected right before the mixers 118 and 119, to correct for true LOFT, but other configurations can be beneficial where the analog DC injection occurs elsewhere in the analog gain/filtering chain 140.

Note that the two DC/LOFT compensation coefficients applied to the I and Q rails at a given stage in the transmit chain, represent a compensation coefficient pair to be adjusted during DC/LOFT calibration. For instance, ci1 and cq1 represent one such coefficient pair, as do ci2 and cq2, or di and dq.

Another possible technique for LOFT compensation utilizes targeted addition (or coupling) of scaled versions of the two mixing signals, that is the carrier signals, 108 and 112 to the RF signal 128. In this technique, not shown in FIG. 4, this scaled injection is programmable by another compensation coefficient pair, fi and fq. The first coefficient, fi, represents the strength of the addition of I-rail mixing signal 108 to the overall RF signal 128, whereas fq represents the strength of the Q-rail mixing signal 112 coupling into the RF signal 128. By adjusting fi and fq to appropriate values, the LOFT coupling process 121 and 123 can be canceled. Typically, the scaling represented by fi/fq will essentially be a programmable attenuation, because the LOFT coupling 121, 123 into the RF signal 128 is much smaller than the original carrier signals 108, 112 which are the source for the undesired coupling.

In practice, depending on the achievable resolution of the various DC/LOFT compensation coefficients and the availability of circuits representing the various coefficient pairs, DC injection at baseband (ci/cq, di/dq coefficients) will partially or completely cancel one or more of DC offset and true LOFT, and a carrier injection at the radio frequency (fi/fq) will partially or completely cancel one or more of DC offset and true LOFT, too.

III. METHODS AND SYSTEMS FOR CALIBRATING I/Q IMBALANCE AND LOFT COEFFICIENTS

I/Q imbalance and LOFT coefficients can be refined by downconverting the output of the transmitter 100, and measuring I/Q imbalance and LOFT at baseband. One drawback of this approach is that the down-converting circuitry can be an additional source of I/Q imbalance and LOFT/DC offset. This can be partly ameliorated with more expensive receiver components. But this will increase the cost of the system beyond what is commercially practicable for many applications.

Thus, in accordance with an aspect of the invention, transmitter I/Q imbalances and/or LOFT are measured at RF, thus avoiding gain and/or phase imbalances and DC impairments of the receiver portion interfering with desired measurements of transmitter-related impairments.

A. Diagnosing I/Q Imbalance and LOFT from RF Envelope (Spectral Component Analysis)

In accordance with an aspect of the present invention, a ringing or beating effect in the envelope of the radio signal 128 is exploited for LOFT and I/Q imbalance calibration. This is described below with reference to FIGS. 6, 7, 8, 9 and 10.

Figure 6:
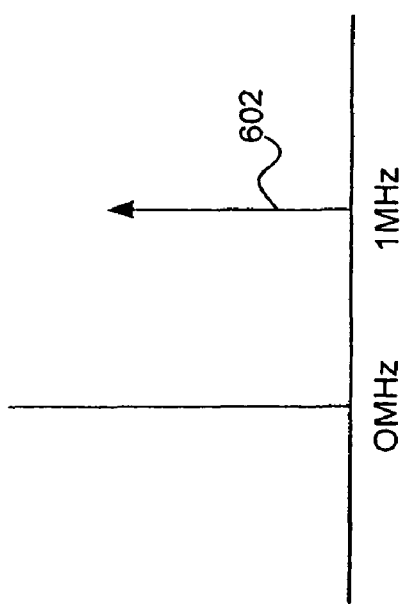
FIG. 6 is a frequency spectrum diagram of an example +1 MHz test tone at complex baseband.

FIG. 6 is a frequency spectrum diagram of an example $f_{test}$=+1 MHz test tone 602, which is input into the transmitter 100. The "+" in front of the 1 MHz is to emphasize that test tone 602 in not a real signal, but an exp(j $2\pi f_{test} t$) test tone at complex baseband.

In an ideal transmitter, a clean baseband tone leads to a perfectly flat RF envelope. FIG. 9 is a timing diagram of such a base band tone, frequency up-converted to an RF frequency. The resulting RF signal 902 has a perfectly smooth envelope

904. When there is I/Q imbalance and/or LOFT, however, the test tone and the unwanted frequency components will cause a "beating" effect on the RF envelope. In other words, the signal 902 is amplitude modulated.

Figure 7:
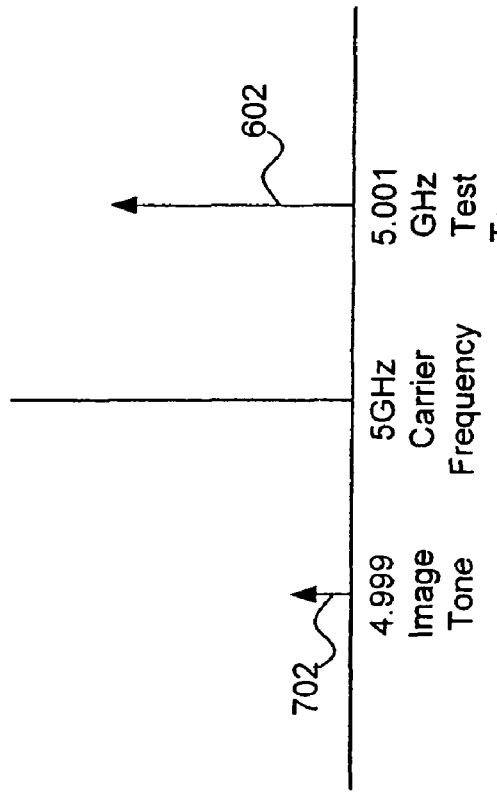
FIG. 7 is a frequency spectrum diagram of the 1 MHz test tone, up-converted using a 5 GHz mixer signal, at 5.001 GHz, and an image signal.

For example, FIG. 7 is a frequency spectrum diagram of the 1 MHz test tone 602, up-converted using a 5 GHz mixer signal (108 and 112 in FIG. 1), to 5.001 GHz. Due to gain and/or phase imbalances, an image tone 702 of the test tone 602 appears at 4.999 GHz.

Figure 8:
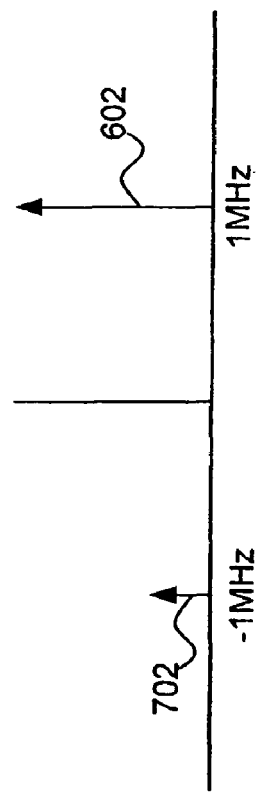
FIG. 8 is a frequency spectrum diagram of the 1 MHz test tone and the image signal, frequency down-converted.

A theoretical calibration approach would be to use a perfect downconverter, or receiver, to downconvert the testtone and use some method to measure and correct for I/Q imbalance and/or LOFT at baseband. For example, FIG. 8 is a frequency spectrum diagram of the test tone 602 downconverted to 1 MHz, with the image tone appearing at −1 MHz.

But in reality, a perfect downconverter would be prohibitively expensive to build. A less than perfect system would inject its own DC offsets and would have its own impact on IQ imbalance. As a result, it would be difficult to distinguish between transmitter imbalance and receiver imbalance. In accordance with an aspect of the invention, therefore, I/Q imbalance and/or LOFT is measured on the upconverted testtone.

FIGS. 10A and 10B are example timing diagrams of the RF signal 902 having a beating effect on the envelope 904. The frequency of the beating of the envelope (e.g., as illustrated by corresponding RF signals shown in FIGS. 10A and 10B) is a function of RF impairments (I/Q imbalances and/or LOFT). LOFT leads to frequency components in the envelope at n times the frequency of the test tone, where n is an integer (0, 1, 2, 3 . . . )(i.e., even and odd harmonics). In other words, LOFT has frequency components in the envelope beating of a test tone signal of n*f_test, where f_test is the frequency of a pure complex testtone generated at baseband and upconverted to RF. A spectral component in the envelope signal at 1*f_test has a periodicity of 1/f_test, illustrated in FIG. 10B; this is the first (n=1) and dominant harmonic in the envelope signal caused by LOFT.

In contrast, IQ imbalance shows up at 2*m*f_test harmonics (i.e., it only shows up on the even harmonics), where again m is 0, 1, 2, 3, . . . .

For IQ imbalance, the $2^{nd}$ harmonic of the testtone frequency (i.e., m=1 in 2*m*f_test) is typically dominant in the envelope. The periodicity pertaining to a 2*f_test beating is given by 1/(2*f_test), and is illustrated in 10B. Note, however, that the 2*f_test component may also be due to a LOFT component present in the RF signal, i.e., for n=2 in n*f_test.

The beating of the envelope, as described above, is used in the present invention as a calibration metric to calibrate and precompensate the IQ imbalance and LOFT.

Note that if LOFT is not compensated for and IQ imbalance is present, too, the 2*f_test component in the envelope will be due to both IQ imbalance and LOFT. So even if LOFT was of limited importance on its own, reducing LOFT effects helps to insure a suitable IQ imbalance calibration. This is because, when LOFT is eliminated or substantially eliminated, the even harmonics in the envelope beating will be entirely caused by IQ imbalance. Therefore, it can be desirable to reduce the envelope beating due to LOFT before analyzing the envelope beating due to I/Q imbalance. This can be accomplished by investigating the even harmonics of the test tone frequency in the envelope. This is further described below.

By monitoring one or more odd harmonics in the envelope, such as the first harmonic (1 times the test tone frequency), which is typically the strongest spectral component due to LOFT, LOFT can be compensated prior to compensating for I/Q imbalance. In an embodiment, LOFT is compensated for by adding DC components in the way of LOFT compensation $c_I$ and $c_Q$, and/or $d_I$, and $d_Q$, until the beating on the first harmonic decreases sufficiently. This reduces the LOFT impact on the entire envelope, that is, on all spectral components, even and odd harmonics. Then, the second harmonic is used to monitor the effect of the image tone on the envelope.

The calibration approach described herein has a number of advantages, including utilizing circuitry that is common to both I/Q imbalance measurements and LOFT measurements and precompensation adjustments.

There are other methods for measuring LOFT. For example, in an uncalibrated transmitter, LOFT will be present at the antenna even when no input signal is provided to the transmitter 100. Accordingly, LOFT can be measured by disabling the input to the transmitter 100, and measuring power levels at the output of the transmitter 100. The DC Offset calibration coefficients di, dq, ci, and cq, can then be adjusted to reduce the power levels at the output. This procedure however, requires very sensitive power measurement circuitry, which may be hard to achieve especially when accurate LOFT compensation is needed.

Figure 5:
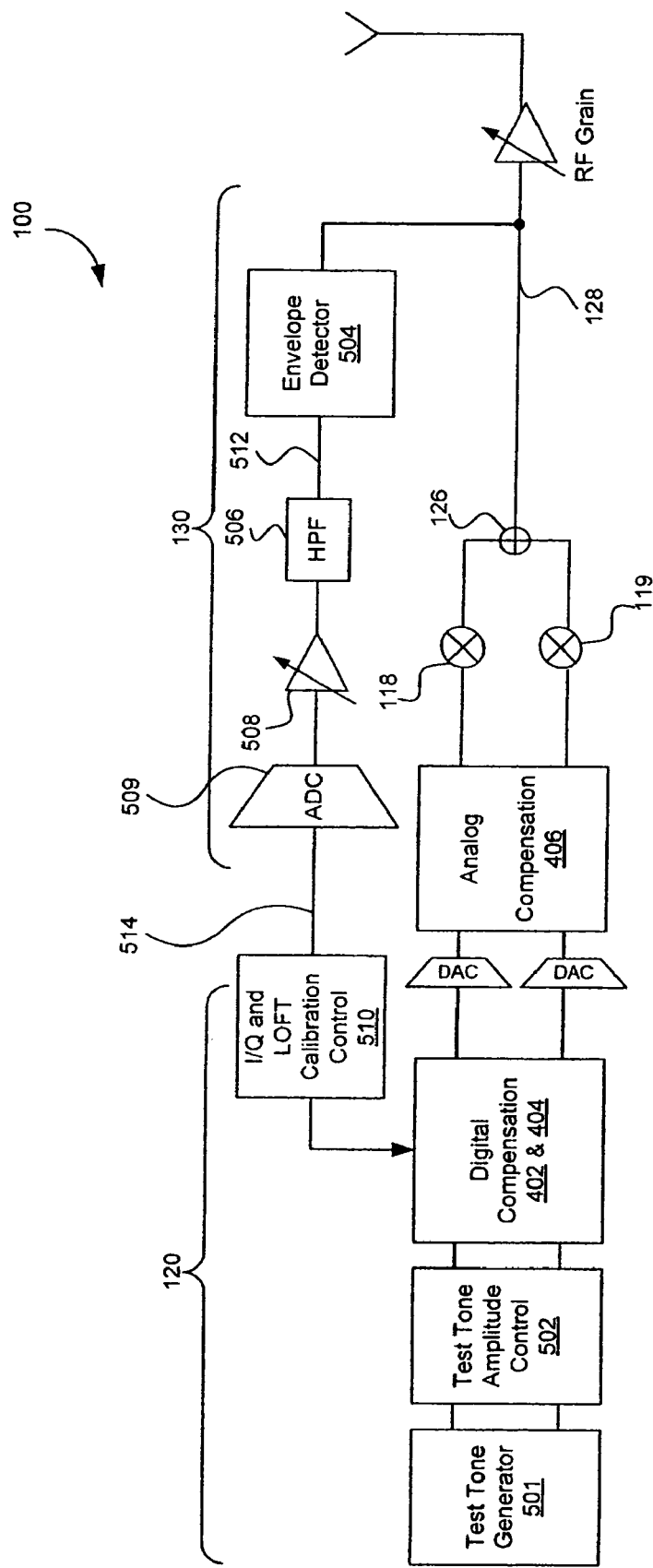
FIG. 5 is an example high level block diagram of the transmitter, as illustrated in FIG. 4, further including a test tone generator, test tone amplitude control, an envelope detection path, and a calibration control module.

FIG. 5 is an example high level block diagram of the transmitter 100, as illustrated in FIG. 4, further including a test tone generator 501, test tone amplitude control module 502, and an envelope detection path. The envelope detection path includes an envelope detector 504, a high pass filter 506, an envelope path gain control module 508, an analog-to-digital converter (ADC) 509, and an I/Q and LOFT calibration control module 510.

In an embodiment, the test tone generator 501 is implemented as a sample play buffer. The sample play buffer includes a storage medium that stores samples of a complex sinusoid. The stored samples encompass an integral number of test tone periods. During calibration, the samples are played repeatedly into the transmitter 100. The samples are upconverted by the mixers 118 and 119, becoming output RF signal 128.

The envelope detector 504 detects the envelope of the output RF signal 128. Resultant envelope information 512 is provided to the I/Q calibration control module 510. The I/Q calibration control module 510 analyzes the envelope beating and generates appropriate compensation (i.e., I/Q imbalance compensation a and b, and LOFT compensation di, dq, ci and cq), as described above with respect to FIG. 4. Further details of the transmitter 100, as illustrated in FIG. 5 are provided in sections below.

I/Q imbalance compensation and LOFT compensation can be iteratively refined, adjusting coefficients for one, then the other, repeatedly, progressively increasing the precision of the adjustments with each iteration. As described below, test tone amplitude 502 and/or envelope detector gain 508 are adjusted as needed to increase the visibility of the remaining envelope beating.

Iterative, i.e., alternate, refinement of I/Q imbalance and LOFT compensation coefficients is beneficial in ensuring that the overall envelope beating amplitude is reduced. If iterative refinement is not performed, one of the impairments may lead to a strong envelope beating at the corresponding spectral component while the other spectral component is relatively weak. Then, if the test tone amplitude 502 or the envelope detector gain 508 are increased to generate a larger beating for improved visibility of the weak spectral component in the envelope, the other spectral component will become stronger, too. This may lead to saturation of the envelope detector, the Analog-to-Digital Converter 509 or other components in the envelope detector path. Saturation is a non-linear distortion which leads to a loss in integrity on the monitored envelope signal. Here, the spectral composition of the resulting envelope signal 512 and its digitized form 514 would be affected, reducing or destroying the effectiveness of the calibration.

In an embodiment, analog DC offset coefficients are adjusted initially (i.e., ci and cq), to reduce LOFT. This is generally a relatively coarse adjustment because the analog injections tend not to be as accurate as digital injections (i.e., di and dq). In the example of FIG. 4, this can include adjusting ci3 and cq3, ci2 and cq2, then ci1 and cq1. This initial LOFT calibration reduces the second harmonic due to LOFT. Therefore, any remaining second harmonic beating is due primarily to I/Q imbalance. In other words, the second harmonic is relatively clean for I/Q imbalance calibration purposes.

After the coarse adjustment for LOFT, I/Q imbalance is addressed with relatively coarse calibrations to values a and b. This reduces the even harmonics in the envelope.

Fine tuning adjustments are then performed on LOFT coefficients, typically using digital coefficients (i.e., di and dq). This brings down the first harmonic and second harmonic due to LOFT.

Fine tuning adjustments are then performed on I/Q imbalance coefficients a and b.

B. Pair-Wise and Iterative Coefficient Calibration

Compensation coefficients (e.g., a, b, di, dq, ci, and cq), are optionally calibrated on a pair-wise basis, each pair including an in-phase coefficient and its corresponding quadrature coefficient as shown in FIG. 4. While a selected pair of coefficients is being adjusted, all other coefficients are held constant. A single calibration module can be used for all coefficient calculations.

Calibration of a selected pair of coefficients is now described. Initially, starting values are loaded into all compensation coefficients. Those can be chosen to be zero, i.e., to perform no compensation at the beginning of the calibration. Alternatively, if rough values are known for all or some of the compensation coefficients based on, for instance, laboratory measurements on selected samples of the circuit, those can be used as a starting point for the automatic calibration.

For the coefficient pair under test, a starting set of coefficient values are applied to the selected coefficient pair. Amplitude and gain control is adjusted, as needed, to make sure that the envelope beating is visible enough to calibrate, without saturating components. While holding all other coefficients constant at their initial (so far known to be best values), and holding the amplitude 502 and gain settings 508 constant, multiple sets of coefficient values are applied to the selected coefficient pair. Measurements are taken for each pair of values applied to the coefficient pair under test. The pair of values that provided the best calibration is identified The calibration can refine the search for calibration values around the newly found best settings for the pair under test (several iterations with successive refinements of the coefficient pair can be performed), or the calibration can proceed with another pair of coefficients.

At the outset of each new set of measurements for a coefficient pair, the test tone amplitude 502 and/or envelope gain 508 may need to be adjusted so that the envelope beating is visible but non-clipping.

IV. EXAMPLE EMBODIMENTS

Figure 11:
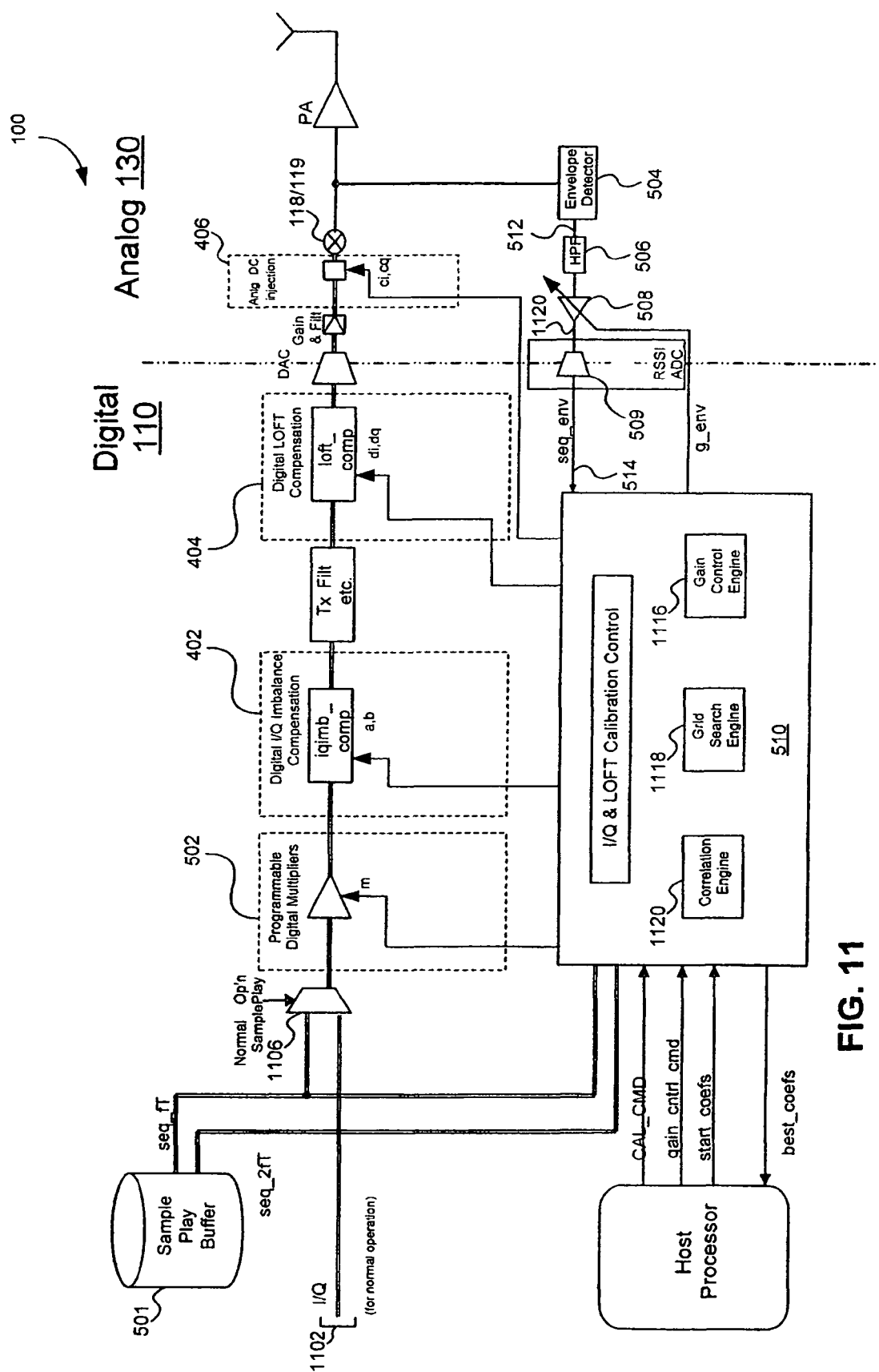
FIG. 11 is a more detailed block diagram of the transmitter as illustrated in FIG. 5.
Figure 12:
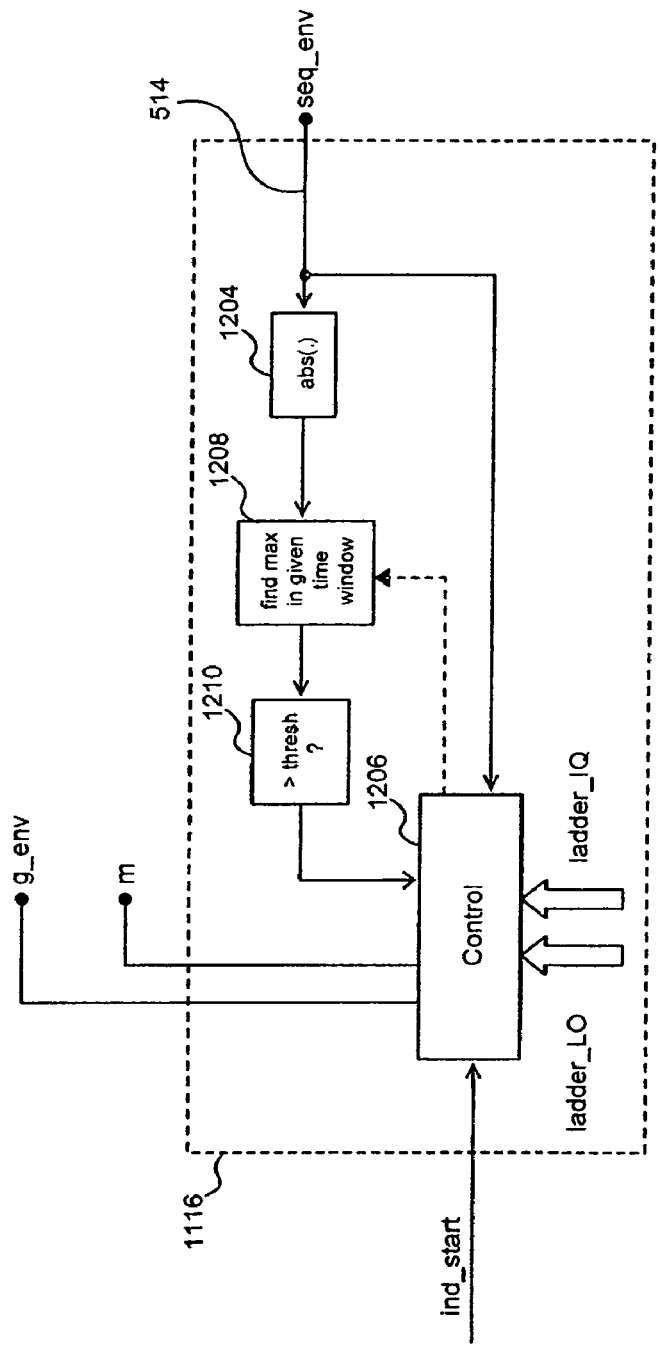
FIG. 12 is a block diagram of a gain control engine within an I/Q & LOFT Calibration Control module of the transmitter.

FIG. 11 is a more detailed block diagram of the transmitter 100 illustrated in FIG. 5. For ease of illustration, separate I and Q paths are not illustrated in FIG. 11. The discussion of FIG. 11 begins with the testtone generator 105.

The test tone generator 501 generates a pure complex test tone in the digital domain, seq_fT. In the example of FIG. 11, the test tone generator 501 is illustrated as a sample play buffer. As described above, the sample play buffer includes a storage medium that holds samples of a complex sinusoid. The samples encompass an integral number of test tone periods. During calibration, the samples are played repeatedly into the transmitter 100. This is illustrated in FIG. 11 as testtone signal seq_fT. An input multiplexer 1106 is controlled to pass the transmit signal 1102 during normal operation, or the test tone signal seq_fT during calibration.

In the example of FIG. 11, the test tone generator 501 also outputs a second signal, seq_2fT, which is another pure complex tone, but at twice the testtone frequency of testtone seq_fT. This can be accomplished by outputting every other sample from the sample play buffer, at the same speed that the full set of samples are output for the signal seq_fT. The invention is not, however, limited to this embodiment. Based on the description herein, one skilled in the relevant art(s) will understand that a suitable complex testtone having twice the frequency of the signal seq_fT can be generated by means other than the testtone generator 105.

The signal seq_2fT is used for correlation purposes in the frequency-specific analysis of the envelope beating, and is discussed further below with respect to the I/Q and LOFT calibration and control module 510.

Also in the example of FIG. 11, the I/Q and LOFT calibration and control module 510 includes an amplitude/gain control engine 1116, a grid search engine 1118, and a correlation engine 1120. Note that a single I/Q and LOFT calibration and control module 510 can be used to calibrate all coefficients (a, b, di, dq, ci, and cq). In a multiple transmitter/antenna environment, described below, a single I/Q and LOFT calibration and control module 510 can be used to calibrate coefficients across the multiple transmitters.

The amplitude/gain control engine 1116 controls the amplitude of the test tone going out of the digital circuit and into the analog circuit of the transmitter by changing the amplitude setting "m" to programmable digital multipliers 502. The amplitude/gain control engine 1116 also controls amplification of the envelope beating signal 1120 by changing the gain settings g_env on the programmable amplifiers 508 in the envelope branch of the analog circuit on the transmitter. The amplitude/gain control engine 1116 is further described below with respect to FIGS. 13A, 133B, and 13C.

The grid search engine 1118 refines DC injection values (e.g., $d_I$, $d_Q$, $c_I$, and $c_Q$) and I/Q compensation values "a" and "b" during the calibration process. The grid search engine 1118 is described below with respect to FIGS. 15 and 16.

The correlation engine 1120 performs measurements on the envelope beating, analyzing a desired frequency component in the envelope signal. The correlation engine 1120 is described below with respect to FIG. 14.

A. Envelope Beating Measuring (DFT)

FIG. 14 is an example block diagram of the correlation engine 1120. The correlation engine 1120 is controlled to select whether the first or second harmonic is monitored. The correlation engine 1120 also measures the envelope beating at the selected harmonic. Operation of the correlation engine 1120 is now described.

The correlation engine 1120 receives signal seq_env 514, which is the digitized envelope beating signal coming from the transmitter. Seq_env 514, which includes any envelope beating, has both first, second, etc., harmonics of the test tone frequency.

In the example of FIG. 11, the correlation engine 1120 also receives the two test tone signals seq_fT and seq_2fT, from the test tone generator 501. Alternatively, the signal seq_fT and/or the signal seq_2fT are received from another source. A switch 1404 is controlled to select between the two signals.

During calibration, spectral tones in the beating on seq_env are measured. The first harmonic is the primary metric for LOFT. The second harmonic is the primary metric for I/Q imbalance.

In order to monitor or measure the envelope beating, the correlation engine effectively performs a Fourier transform on the seq_env signal. In the example of FIG. 14, this is accomplished by multiplying the seq_env signal with the appropriate exponential sequence of the test tone (i.e, the test tone signal that corresponds to that frequency component of interest), followed by a window integration.

For example, when the first harmonic is of interest (e.g., for LOFT calibration), the corresponding exponential sequence of the test tone signal is the test tone frequency component itself. This is given by seq_fT, which is the same signal that is transmitted on the transmit chain. Thus, for LOFT calibration, switch 1404 selects the seq_fT signal. The seq_fT signal, representing a reference signal for the frequency analysis, is then multiplied with the seq_env signal by a multiplier 1406. The result is window integrated by a window integrator 1408, that is, all results from the multiplication over a given time period are summed up. Note that the time period of this window integration should be a multiple of the test tone period. The result of this window integration is an indication of the strength of the spectral component of the envelope signal at the test tone frequency. The absolute value of this is taken with an absolute value module 1410. The outcome is a measure of the energy in the beating at the desired frequency, i.e., here the testtone frequency. This is referred to herein as a beat metric, illustrated in FIG. 14 as beat_metric. Compensation coefficients are then experimentally adjusted to gradually reduce the beat_metric. Coefficient adjustment is described below.

I/Q calibration is performed by monitoring envelope beating on an even harmonic, such as the second harmonic. In this case, switch 1404 is controlled to select the seq_2fT signal. The seq_2fT signal, which now represents the reference signal for the frequency analysis, is then multiplied with the seq_env signal. The result is window integrated. The absolute value of the window integration is now an indication of the strength of the spectral component of the envelope signal at two times the test tone frequency, and is output as the beat_metric. Coefficients are then adjusted to reduce the beat_metric.

B. Grid Searching

The coefficients a and b, $d_I$ and $d_Q$, $c_I$ and $c_Q$ are adjusted to reduce the envelope beating (e.g., beat_metric). As described above, a selected pair of coefficients (one from the I path, and a corresponding one from the Q path for the LOFT calibration; one intra-path coefficient and one cross-path coefficient for the I/Q calibration), is adjusted while other pairs of coefficients are held constant. When an improved set of coefficients is found for the selected pair, the improved set of coefficients can be further refined, or another pair of coefficients can be selected for adjustment. This process can be repeated as needed to refine the coordinates. In the example of FIG. 11, the coefficients are generated by the grid search engine 1118.

FIG. 15 is an example block diagram of the grid search engine 1118. The grid search engine 1118 generates coordinates, i.e., values for the pairs of coefficients. In operation, the grid search engine 1118 receives a starting set, or current set of coefficient value pairs (or coordinates) namely (a, b), ($d_I$, $d_Q$), ($c_I$, and $c_Q$). A pair of coordinates is selected by a selector 1502 for refinement. A grid coordinate generator 1504 generates a grid or array of coordinates (or values), for the selected coordinate pair, to be tested. In the example of FIG. 15, the grid of coordinates includes nine coefficient value pairs (3×3), which are tested for their suitability to compensate for the corresponding impairment. The invention is not however, limited to this example. The grid coordinate generator 1504 is further described below with respect to FIG. 16.

A second selector 1506 selects or receives the remaining coordinates. These remaining coordinates will remain constant during the test/refinement of the grid coordinates generated for the selected pair of coordinates.

A merge module 1508 forwards the coordinates from the selector 1506 to their respective modules (402, 404, 406 in FIG. 11). The merge module 1508 also forwards one pair of coordinates from the grid coordinate generator 1504 to the respective module (402, 404, 406 in FIG. 11). Envelope beating is then measured as described above with respect to FIG. 14. The resultant beat_metric is stored. The process is repeated for the remaining grid coordinates from the grid coordinate generator 1504 until all of the grid coordinates have been processed. The grid coordinate pair that produced the smallest beat_metric becomes the new coordinate starting point for refinement of the selected pair of coordinates.

The process may be immediately repeated for the same pair of coefficients, once or several times, increasing the precision with each iteration when searching around the previously found best point. This is described below with respect to FIG. 16. Increasing the precision level is achieved by reducing the step size. For example, and without limitation, the step size can be reduced by ½ with each iteration.

Alternatively, a new pair of coordinates is selected for refinement. The original pair of coordinates can be further refined after refinement of other coordinates.

Figure 16:
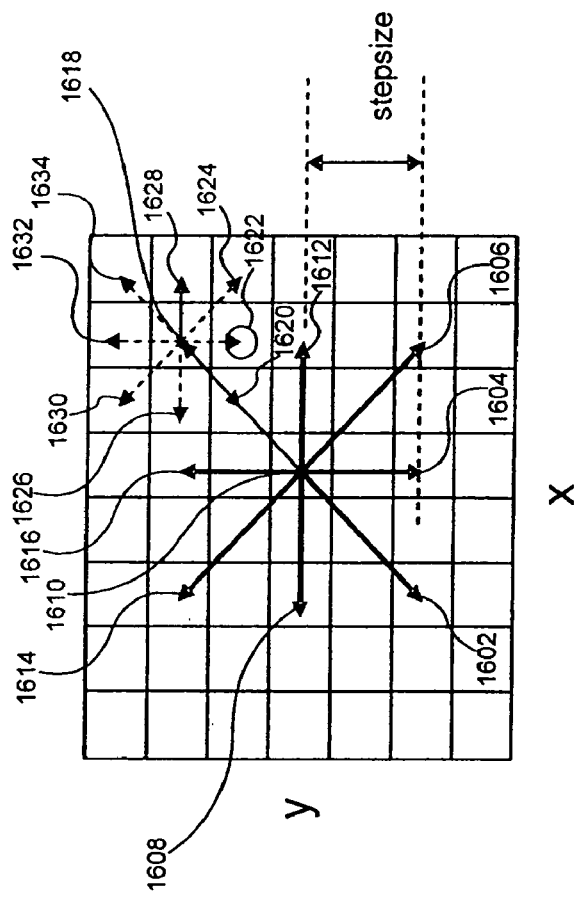
FIG. 16 is an example graph of a grid search performed by the grid search engine within the calibration control module.

FIG. 16 is a graphical illustration of grid search coordinate selection and refinement. An initial set of grid coordinates 1602 through 1618 are processed as described above. In the example of FIG. 16, the coordinate set 1618 is identified as generating the smallest beat_metric. A new set of coordinates, 1618-1634 is then generated around the selected coordinate pair. The new set of coordinates has a smaller step size between coordinates, relative to the step size between the prior coordinates. A typical step size reduction is given by a factor of 2, meaning that the edge length of the 3×3 grid is reduced by 2 between consecutive iterations. The coordinates 1618-1634 are then processed as described above with respect to the coordinates 1602-1618. In the example of FIG. 16, the coordinate set 1622 is selected as the smallest beat_metric. This process can be repeated as many times as desired, gradually reducing the grid size and re-centering the grid to the point which lead to best results in the previous iteration. In one embodiment, the initial step size to be used during the first iteration is provided to the grid search engine when a calibration is started, and the step sizes for the $2^{nd}$ and subsequent iterations are derived by successive division by two of the initial step size internally to the grid search engine.

As noted above, and as further described below, during the process of coordinate refinement, the envelope beating will reduce, possibly to a point where it becomes indistinguishable to the ADC 509 from thermal noise. Accordingly, amplitude and/or gain is adjusted as needed to maintain the beating at a detectable/measurable level. Any amplitude or gain adjustments should be made prior to each new grid search, not during a grid search to maintain comparability between measurements at a given precision level.

C. Amplitude and Gain Control

At the outset, and between calibrations of grid sets, gain control engine 1116 adjusts the values m and g_env to insure that the envelope beating can be seen above thermal noise by the ADC 509, without clipping. Ideally, the analog beating signal 1120 should exploit the dynamic range of the ADC 509 as much as possible to minimize the relative strength of quantization and thermal noise in the resulting digital signal, but without crossing its inputs limits.

In an embodiment, amplitude and gain adjustments are implemented with one or more ladders of values for m and g_env. For example, FIG. 13A illustrates a LOFT ladder 1302 and an I/Q ladder 1304. The LOFT ladder 1302 is utilized during LOFT calibration and the I/Q ladder 1304 is used during I/Q calibration.

The ladders 1302 and 1304 are pre-programmed with values for amplitude and gain control (i.e., m and g_env). In programming the ladders, it is helpful to keep in mind that amplitude adjustments affect the amplitude of the desired signal and any images which are a result of the desired signal, but will not affect the LOFT, which is generated as an RF impairments and does not depend on the signal strength.

Generally, the ladder_LO 1302 is more gain-centric, tending to increase the g_env gain before the test tone amplitude m. Conversely, the ladder _IQ 1304 is generally more amplitude-centric, tending to increase the test tone amplitude m before the gain g_env. From one step on a given ladder to the next step, both m and g_env may increase or decrease. Thereby, when carrying out IQ calibration, the LOFT component in the RF signal will be comparatively week to the actual signal energy of the test tone, causing the envelope ripple at the $2^{nd}$ harmonic to be dominated by the IQ imbalance. Conversely, when carrying out a LOFT calibration, a small digital baseband gain m should be used, in order to reduce a possible envelope beating between the image and the LOFT component, which could interfere with the desired beating between the actual testtone and the LOFT component in the radio signal.

The gain ladders can be software-programmable so that the gain/amplitude values to be used during the gain control cycle can be adjusted depending on the application. For instance, depending on the amplitude that is chosen for the test tone coming from the test tone generator 501 (FIG. 11), different sets of pre-programmed m and g_env values in the ladder may be appropriate.

Figure 13B:
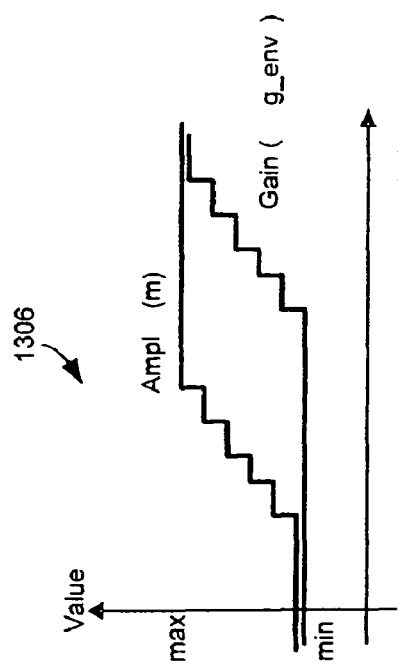
FIG. 13B is a graph of example relative values for the ladder_IQ.
Figure 13C:
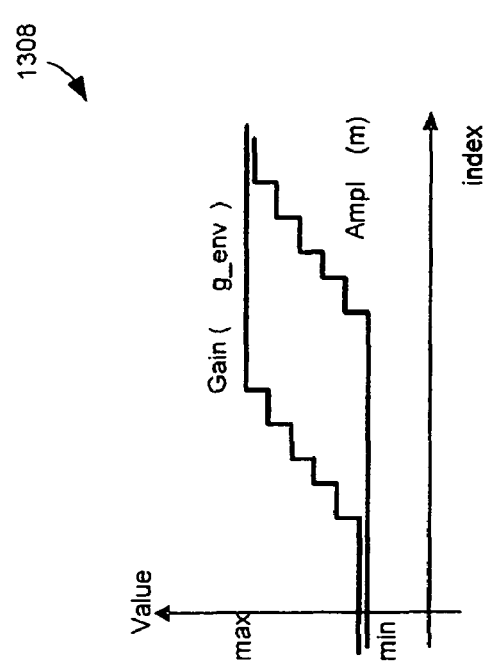
FIG. 13C is a graph of example relative values for the ladder_LO.
Figure 13A:
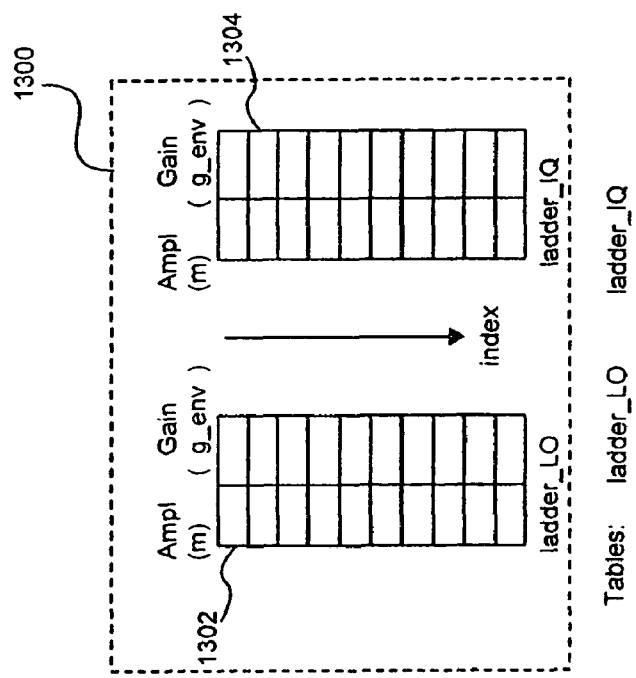
FIG. 13A is an example table of values (i.e., ladder_LO and ladder_IQ), that are utilized by a gain control engine.

FIG. 13B is a graph of example relative values for m and g_env for the I/Q ladder 1304. FIG. 13C is a graphical representation of example relative values for m and g_env for the LOFT ladder 1302. The invention is not, however, limited to the example embodiments herein.

As previously noted, amplitude gain control is performed before each set of measurements (e.g., before each set of 3×3 measurements on a grid of a given stepsize).

In operation, at the outset, there will be a start_index pointing into one of the two ladders, LO_gain_ladder 1302 or IQ_gain_ladder 1304, depending on whether IQ or LOFT is being calibrated. From the selected ladder and the selected starting point, the m and g_env values are taken to start the amplitude/gain control.

The gain control engine 1116 receives digitized envelope seq_env 514 from ADC 509. The signal seq_env is provided to an absolute value module 1204. The absolute value module 1204 outputs the absolute value of the selected envelope seq_env. Module 1208 determines the maximum absolute value over a given time period. The maximum value is provided to a threshold detector 1210. The threshold detector 1210 controls the control module 1206 to go up or down the selected ladder, depending upon whether the absolute value is above or below the threshold.

For example, when the maximum value from 1208 is below the threshold, the control module 1206 moves up the selected ladder (or down the ladder, depending on how the ladder is programmed). A new measurement is then taken and passed through modules 1204, 1208, and 1210. If the threshold is exceeded, the control module 1206 retreats back to the previous ladder index. At this point, the envelope beating is at the desired amplitude for performing the calibration.

At this point, a set of coefficient values (e.g., a 3×3 grid) can be applied as described above, keeping the m and g_env values constant. Thereafter, the amplitude and gain can be re-adjusted as needed, as described above.

It can be beneficial to carry out the analog LOFT calibration, i.e., adjustment of a ci, cq coefficient pair, after setting digital LOFT coefficients di, dq to be zero. This is especially useful if the LOFT is known to be dominated by "true" LOFT caused by the mixer. Then, the analog adjustment will remove most of the LOFT at the location of its actual impairment, while a subsequent adjustment of di, dq (digital LOFT compensation) will only handle small residual perturbations. That way, small additional DC values will be present in all segments of the transmit chain.

D. Multiple Antenna Embodiments

As noted above, I/Q imbalance and LOFT calibration can be performed across multiple transmitters that feed multiple corresponding antennas in a so-called Multiple-Input-Multiple-Output (MIMO) wireless system, using a single I/Q and LOFT calibration control module 510. In such an embodiment, switches (hardware, software, firmware, or combinations thereof), can be utilized to select appropriate inputs from and outputs to a selected transmit path.

In one embodiment, a full initial calibration is performed on one transmit path, then another, substantially as described above. After all transmit paths are initially calibrated, the process is repeated on each path to fine tune the coefficients. This iterative approach may be useful, for example, where portions of multiple transmit paths are fabricated on the same die or are positioned physically proximate to one another. In such a case, adjustments to one path may affect, directly or indirectly, operation of another path due to cross-talk between transmitter chains.

In another embodiment, a partial calibration is performed on one transmit path, then another (e.g., calibrating for LOFT). Then a second partial calibration is performed on the first transmit path, then the other(s) (e.g., I/Q imbalance calibration). If desired, partial or full calibrations can then be performed on each of the transmit paths, as needed.

Optionally, in a multiple transmit path embodiment, initialization of the values m and g_env begins with gain control engine 1116 setting the m value of the antenna branch that is not under test, to zero. This insures that no signal is transmitted on that branch. In this situation, g_env of the branch not under test is essentially irrelevant, because no signal is transmitted on the corresponding antenna branch.

The invention is not limited to these example calibration procedures for multiple transmitter embodiments. Based on the description herein, one skilled in the relevant art(s) will understand that other calibration procedures can be performed in accordance with the calibration procedures described herein.

E. Example Method

Figure 17:
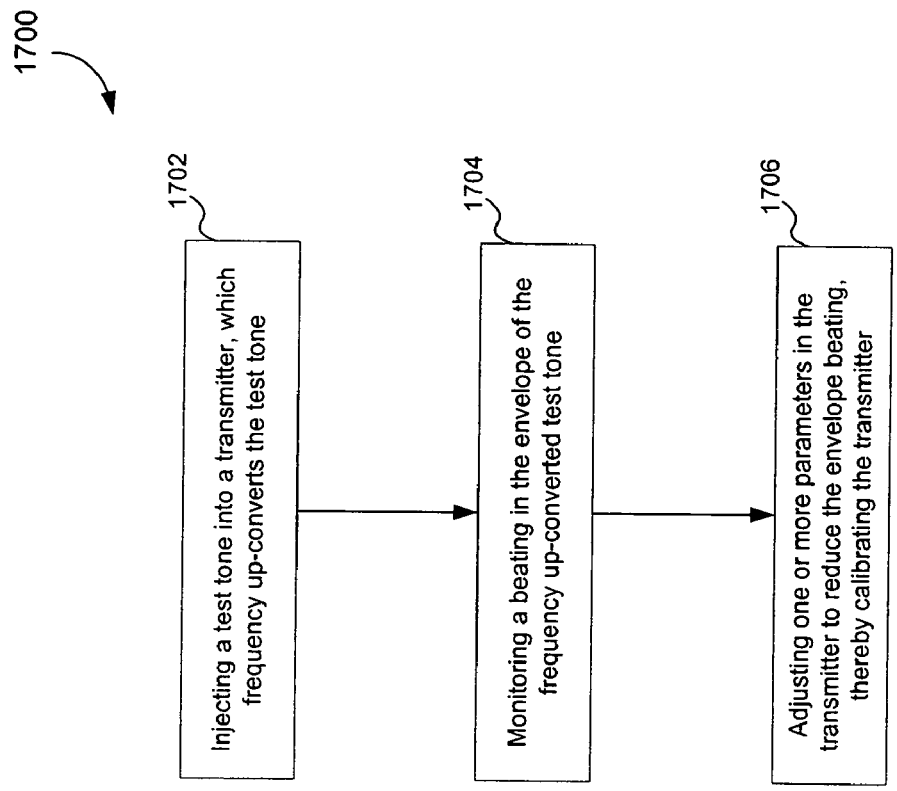
FIG. 17 is a high level example process flowchart illustrating a method of calibrating a transmitter.

FIG. 17 is a high level example process flowchart 1700 illustrating a method of calibrating a transmitter. The process flowchart 1700 can be implemented with one or more of the block diagrams herein. The process flowchart 1700 is not, however, limited to the example block diagrams herein. Based on the description herein, one skilled in the relevant art(s) will understand that the process flowchart 1700 can be implemented in other ways, which are within the spirit and scope of the present invention.

The process begins with step 1702, which includes injecting a test tone into a transmitter, which frequency up-converts the test tone. Step 1704 includes monitoring a beating in the envelope of the frequency up-converted test tone. Step 1706 includes adjusting one or more parameters in the transmitter to reduce the envelope beating, thereby calibrating the transmitter. Each of these features is described in sections above.

Figure 18:
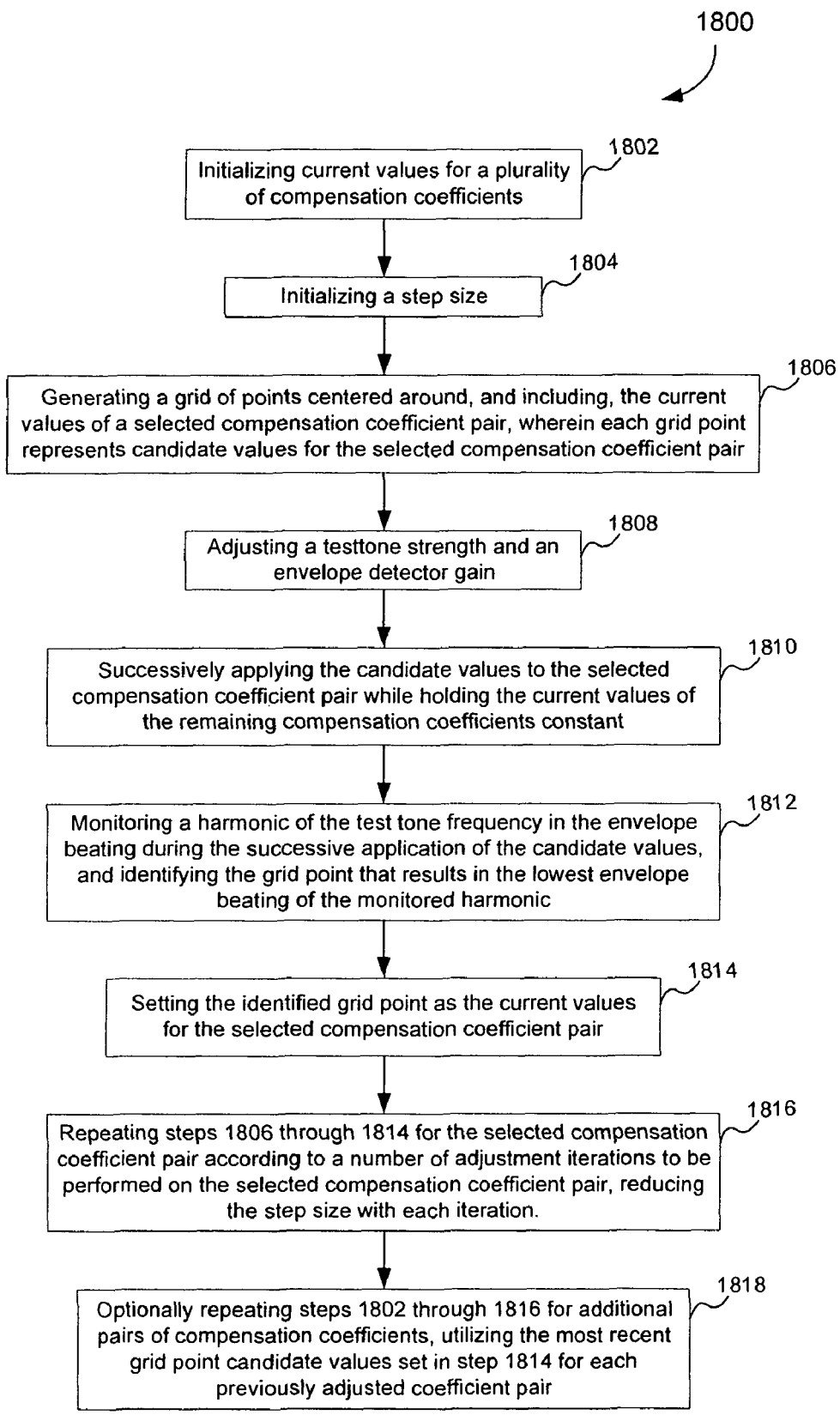
FIG. 18 is a more detailed process flowchart illustrating a method of calibrating a transmitter.

FIG. 18 is a more detailed process flowchart 1800 illustrating an example method of implementing the monitoring and adjusting of steps 1704 and 1706. Again, the invention is not limited to the example of FIG. 18.

The process begins at step 1802, which includes initializing current values for a plurality of compensation coefficients.

Step 1804 includes initializing a step size. The purpose of the step size is described below in relation to step 1806. The step size can be received from a computer system or can be encoded or hard wired within.

Step 1806 includes generating a grid of points centered around, and including, the current values of a selected compensation coefficient pair, wherein each grid point represents candidate values for the selected compensation coefficient pair, and wherein the distances between grid points is a function of the step size, and wherein a smaller step size leads to generation of smaller grid point distances. Grid generation is described in sections above.

Step 1808 includes adjusting a testtone strength and an envelope detector gain, with the current values applied to the plurality of compensation coefficient pairs, thereby improving the detection of the envelope beating without causing clipping. Adjusting of the testtone strength and envelope detector gain are described in sections above.

Step 1810 includes successively applying the candidate values to the selected compensation coefficient pair while holding the current values of the remaining compensation coefficients constant.

Step 1812 includes monitoring a harmonic of the test tone frequency in the envelope beating during the successive application of the candidate values, and identifying the grid point that results in the lowest envelope beating of the monitored harmonic.

Step 1814 includes setting the identified grid point as the current values for the selected compensation coefficient pair.

Step 1816 includes repeating steps 1806 through 1814 for the selected compensation coefficient pair according to a number of adjustment iterations to be performed on the selected compensation coefficient pair, reducing the step size with each iteration.

Optional step 1818 includes repeating steps 1802 through 1816 for additional pairs of compensation coefficients, utilizing the most recent grid point candidate values set in step 1814 for each previously adjusted coefficient pair.

Additional features and variations to the steps described above can be gleaned from other sections herein dealing with the various features and variations.

V. CONCLUSION

The present invention has been described above with the aid of functional building blocks illustrating the performance of specified functions and relationships thereof. The boundaries of these functional building blocks have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by discrete components, application specific integrated circuits, processors executing appropriate software and the like and combinations thereof.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

It is to be appreciated that the Detailed Description section, and not the Summary and Abstract sections, is intended to be used to interpret the claims. The Summary and Abstract sections may set forth one or more, but not all, exemplary embodiments of the present invention as contemplated by the inventor(s), and thus, are not intended to limit the present invention and the appended claims in any way.

What is claimed is:

1. A method of calibrating a transmitter, comprising:
injecting a test tone having a frequency into a transmitter, whereby the transmitter frequency up-converts the test tone using quadrature carrier signals to generate a frequency up-converted test tone;
monitoring a beating in the envelope of the frequency up-converted test tone; and
adjusting one or more parameters in the transmitter to reduce the envelope beating, thereby calibrating the transmitter, wherein the adjusting includes adding digital DC prior to a digital-to-analog converter in the transmitter.

2. The method according to claim 1, wherein the monitoring comprises monitoring an odd harmonic of the test tone frequency in the envelope beating, and wherein the adjusting comprises adjusting one or more of DC offset compensation and local oscillator feed-through (LOFT) compensation.

3. The method according to claim 2, wherein the adjusting further comprises one or more of adding DC at analog baseband, adding DC at digital baseband, or adding scaled versions of the carrier signals to an output of the transmitter.

4. The method according to claim 3, wherein the adjusting further comprises adding analog DC at multiple locations in an analog gain chain.

5. The method according to any of claims 1 through 3, and 4, wherein the monitoring comprises monitoring a first harmonic of the test tone frequency in the envelope beating.

6. The method according to claim 2, wherein the monitoring further comprises monitoring an even harmonic of the test tone frequency in the envelope beating, and wherein the adjusting further comprises adjusting I/Q imbalance compensation.

7. The method according to claim 6, wherein the monitoring and adjusting comprise alternately monitoring the odd harmonic and adjusting one or more of DC offset compensation and LOFT compensation, and monitoring the even harmonic and adjusting IQ imbalance compensation.

8. The method according to any of claims 6 through 7, wherein the monitoring comprises monitoring first and second harmonics of the test tone frequency in the envelope beating.

9. The method according to claim 1, wherein the monitoring comprises monitoring an even harmonic of the test tone frequency in the envelope beating, and wherein the adjusting comprises adjusting I/Q imbalance compensation.

10. The method according to claim 9, wherein the adjusting I/Q imbalance compensation comprises adjusting digital I/Q imbalance compensation.

11. The method according to claim 10, wherein the adjusting digital I/Q imbalance compensation comprises adjusting an intra-path gain and a cross-path gain.

12. The method according to claim 11, wherein the intra-path gain is a multiplier in the form of "1+b", and wherein the cross-path gain is a multiplier in the form of "a".

13. The method according to claim 11, wherein the intra-path gain is added in an I path.

14. The method according to claim 11, wherein the intra-path gain is added in a Q path.

15. The method according to any of claims 9 through 14, wherein the monitoring comprises monitoring a second harmonic of the test tone frequency in the envelope beating.

16. The method according to claim 1, wherein:
the monitoring and adjusting comprise alternately monitoring an odd harmonic and adjusting one or more of DC offset compensation and LOFT compensation, and monitoring an even harmonic and adjusting IQ imbalance compensation;
the adjusting one or more of DC offset compensation and LOFT compensation includes adjusting DC injection coefficients;
the adjusting I/Q imbalance compensation includes adjusting I/Q imbalance compensation coefficients; and
wherein the DC injection coefficients and the I/Q imbalance compensation coefficients are iteratively refined with each alternation of the monitoring and adjusting steps.

17. The method according to claim 16, wherein the monitoring comprises monitoring first and second harmonics of the test tone frequency in the envelope beating.

18. The method according to claim 1, wherein the monitoring and adjusting comprises:
(a) initializing current values for a plurality of compensation coefficients pairs;
(b) initializing a step size;
(c) generating a grid of points centered around, and including, the current values of a selected compensation coefficient pair, wherein each grid point represents candidate values for the selected compensation coefficient pair, and wherein the distance between grid points is a function of the step size and wherein a smaller step size leads to generation of smaller grid point distances;
(d) adjusting a testtone strength and an envelope detector gain, with the current values applied to the plurality of compensation coefficient pairs, thereby improving the detection of the envelope beating without causing clipping;
(e) successively applying the candidate values to the selected compensation coefficient pair while holding the current values of the remaining compensation coefficients constant;
(f) monitoring a harmonic of the test tone frequency in the envelope beating during the successive application of the candidate values, wherein the monitored harmonic is associated with the selected compensation coefficient pair, and identifying the grid point that results in the lowest envelope beating of the monitored harmonic;
(g) setting the identified grid point as the current values for the selected compensation coefficient pair; and
(h) repeating steps (c) through (g) for the selected compensation coefficient pair according to a number of adjustment iterations to be performed on the selected compensation coefficient pair, reducing the step size with each iteration.

19. The method according to claim 18, further comprising:
repeating steps (a) through (h) for additional pairs of the plurality of compensation coefficients;
wherein step (a) comprises utilizing the most recent grid point candidate values set in step (g) for each previously adjusted coefficient pair.

20. The method according to claim 19, further comprising:
utilizing different starting step sizes for at least some of the compensation coefficient pairs.

21. The method according to claim 19, further comprising:
utilizing different numbers of iterations for at least some of the compensation coefficient pairs.

22. The method according to claim 19, further comprising:
utilizing different starting step sizes for at least some of the compensation coefficient pairs; and
utilizing different numbers of iterations for at least some of the compensation coefficient pairs.

23. The method according to claim 22, further comprising:
utilizing different step size reductions for at least some of the compensation coefficient pairs.

24. The method according to claim 22, further comprising:
receiving the step size and an indication of the number of adjustment iterations to be performed for the compensation coefficient pairs.

25. The method according to claim 24, further comprising:
receiving a step size reduction value.

26. The method according to any of claims 18 through 22, wherein step (h) comprises reducing the step size by a factor with each iteration.

27. The method according to claim 26, wherein step (h) comprises reducing the step size by a factor of two with each iteration.

28. The method according to claim 19, further comprising:
performing steps (a) through (h) for a selected compensation coefficient pair utilizing a relatively coarse initial step size;
thereafter performing steps (a) through (h) for one or more additional compensation coefficient pairs; and
thereafter repeating steps (a) through (h) for the selected compensation coefficient pair utilizing a relatively fine initial step size.

29. The method according to claim 19, further comprising:
performing steps (a) through (h) for a selected compensation coefficient pair utilizing a first number of iterations and a relatively coarse initial step size;
thereafter performing steps (a) through (h) for one or more additional compensation coefficient pairs; and
thereafter repeating steps (a) through (h) for the selected compensation coefficient pair utilizing a second number of iterations and a relatively fine initial step size.

30. The method according to claim 19, wherein the monitoring of step (f) is performed for the plurality of pairs of compensation coefficients using a common correlation engine.

31. The method according to claim 19, wherein step (c) comprises generating the grid points for the plurality of pairs of compensation coefficients with a common grid search engine.

32. The method according to claim 18, 19, or 31, wherein the grids are grids of 3-by-3 grid points with essentially equal distances between adjacent grid points.

33. The method according to claim 19, further comprising repeating steps (a) through (h) for one or more additional transmit branches using a common calibration engine.

34. The method according to claim 19, wherein the adjusting of the test tone strength and the envelope detector gain are performed using one or more ladders of pre-programmed values.

35. The method according to claim 34, wherein the adjusting of the test tone strength and the envelope detector gain comprise:
using a first gain-centric ladder when calibrating for DC offset compensation and LOFT, wherein the first gain-centric ladder tends to increase the envelope gain before increasing the test tone amplitude; and
using a second amplitude-centric ladder when calibrating for I/Q imbalance, wherein the second amplitude-centric ladder tends to increase the test tone amplitude before increasing the envelope gain.

36. The method according to claim 19, wherein the plurality of compensation coefficients include DC compensation coefficients and I/Q imbalance compensation coefficients.

37. The method according to claim 1, wherein the monitoring of the envelope beating comprises detecting an envelope of the frequency up-converted test tone and correlating the detected envelope with a sample signal having a frequency that is n times the frequency of the test tone, where n is an odd integer when an odd harmonic of the test tone frequency in the envelope beating is monitored, and wherein n is an even integer when an even harmonic of the test tone frequency in the envelope beating is monitored.

38. The method according to claim 37, wherein the correlation comprises:
multiplying the detected envelope by the sample signal;
integrating the result of the multiplication; and
taking the absolute value of the integration;
wherein the absolute value is a beat metric of the envelope beating.

39. The method according to claim 1, wherein the injecting of the test tone comprises continuously replaying a sequence of samples at a sampling speed, from a sample buffer, wherein the sequence of samples represent a complex sinusoidal signal.

40. The method according to claim 39, wherein the monitoring comprises:
receiving the sequence of samples at the sampling speed, as a first correlation reference signal;
simultaneously with the continuous replaying of the sequence of samples, reading every other sample, at the sampling speed, of the sequence of samples from the sample buffer, as a second correlation reference signal;
detecting an envelope of the frequency up-converted test tone;
correlating the detected envelope with the first correlation reference signal to monitor a first harmonic of the test tone frequency in the envelope beating; and
correlating the detected envelope with the second correlation reference signal to monitor a second harmonic of the test tone frequency in the envelope beating.

41. The method according to claim 40, wherein the correlation comprises:
multiplying the detected envelope by the first or second correlation reference signal;
integrating the result of the multiplication; and
taking the absolute value of the integration;
wherein the absolute value is a beat metric of the envelope beating of the corresponding harmonic.

42. A method of calibrating a transmitter for actual and/or effective local oscillator feedthrough, comprising:
(a) injecting a test tone having a frequency into a transmitter, whereby the transmitter frequency up-converts the test tone to generate an up-converted test tone;
(b) detecting an envelope of the up-converted test tone, whereby the envelope has a beating due to one or more of DC offset and local oscillator feed-through;
(c) adjusting a test tone strength so that the beating is relatively small but measurable;
(d) adjusting an envelope detector gain, thereby utilizing a range of an analog-to-digital converter (ADC) in an envelope detection path;
(e) monitoring an odd harmonic of the envelope beating; and
(f) adjusting DC compensation in the transmitter to reduce the envelope beating in the odd harmonic.

43. The method according to claim 42, wherein steps (c) through (f) are performed for multiple DC compensation coefficient pairs.

44. The method according to claim 43, wherein steps (c) through (f) are performed multiple times for each DC compensation coefficient pair, thereby refining coordinates for the each of the DC compensation coefficient pairs.

45. A method of calibrating a transmitter for I/Q imbalance, comprising:
(a) injecting a test tone having a frequency into a transmitter, whereby the transmitter frequency up-converts the test tone to generate an up-converted test tone;
(b) detecting an envelope of the up-converted test tone, whereby the envelope has a beating due to one or more of DC offset and local oscillator feed-through;
(c) adjusting a test tone strength so that the beating is relatively strong without clipping;
(d) adjusting an envelope detector gain, thereby utilizing a range of an analog-to-digital converter (ADC) in an envelope detection path;
(e) monitoring an even harmonic of the envelope beating; and
(f) adjusting I/Q compensation in the transmitter to reduce the envelope beating in the even harmonic.

46. The method according to claim 45, wherein steps (c) through (f) are performed for multiple I/Q imbalance coefficient pairs.

47. The method according to claim 46, wherein steps (c) through (f) are performed multiple times for each I/Q imbalance coefficient pair, thereby refining coordinates for the each of the DC compensation coefficient pairs.

48. The method according to claim 45, further comprising calibrating for actual and/or effective local oscillator feedthrough.

49. The method according to claim 48, wherein the calibrating for actual and/or effective local oscillator feedthrough comprises:
disabling input to the transmitter and measuring power output from the transmitter;
measuring a power output from the transmitter; and
adjusting DC compensation to the transmitter to reduce the power output.

50. The method according to claim 48, wherein the calibrating for actual and/or effective local oscillator feedthrough comprises:
(g) adjusting the test tone strength so that the beating is relatively small but measurable;
(h) adjusting an envelope detector gain, thereby utilizing a range of an analog-to-digital converter (ADC) in an envelope detection path;

(i) monitoring an odd harmonic of the test tone frequency in the envelope beating;

(j) adjusting DC compensation in the transmitter to reduce the envelope beating in the odd harmonic.

51. The method according to claim 50, wherein steps (g) through (j) are performed prior to steps (c) through (f).

52. The method according to claim 51, wherein steps (g) through (j) are performed for multiple DC compensation coefficient pairs, and wherein steps (c) through (f) are performed for multiple I/Q imbalance coefficient pairs.

53. The method according to claim 52, wherein steps (g) through (j) are performed multiple times for each DC compensation coefficient pair, and wherein steps (c) through (f) are performed multiple times for each I/Q imbalance coefficient pair.

54. The method according to claim 52, wherein the adjusting of DC compensation coefficient pairs and I/Q imbalance coefficient pairs are performed by a common calibration engine.

* * * * *